(12) United States Patent
Zhou et al.

(10) Patent No.: US 8,085,783 B2
(45) Date of Patent: Dec. 27, 2011

(54) PRIORITY SERVICE SCHEME

(75) Inventors: Jingyi Zhou, South River, NJ (US);
Patricia R. Chang, San Ramon, CA (US); Maria G. Lam, Irvine, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 203 days.

(21) Appl. No.: 12/481,820

(22) Filed: Jun. 10, 2009

(65) Prior Publication Data
US 2010/0316063 A1 Dec. 16, 2010

(51) Int. Cl.
*H04L 12/56* (2006.01)
(52) U.S. Cl. ................... 370/395.21; 370/462
(58) Field of Classification Search .................. 370/329, 370/331, 352; 455/406; 709/227
See application file for complete search history.

(56) References Cited

U.S. PATENT DOCUMENTS

| | | | | |
|---|---|---|---|---|
| 6,888,821 | B2 * | 5/2005 | Rasanen et al. | 370/352 |
| 6,910,074 | B1 * | 6/2005 | Amin et al. | 709/227 |
| 2007/0121542 | A1 * | 5/2007 | Lohr et al. | 370/329 |
| 2008/0279139 | A1 * | 11/2008 | Beziot et al. | 370/329 |
| 2009/0093231 | A1 * | 4/2009 | Zhao | 455/406 |
| 2009/0129342 | A1 * | 5/2009 | Hwang et al. | 370/331 |

* cited by examiner

*Primary Examiner* — Kwang B Yao
*Assistant Examiner* — Syed M Bokhari

(57) ABSTRACT

A method includes indicating a state associated with a priority service subscription indicator, indicating a state associated with a priority service activation indicator and receiving an input request for invoking a priority service for a priority communication. The method further includes determining whether a user of a user device is a subscriber of the priority service based on the state associated with the priority service subscription indicator and establishing network resources on which the priority communication is to be transmitted, based on at least one of the state associated with the priority service subscription indicator or the state associated with the priority service activation indicator.

25 Claims, 20 Drawing Sheets

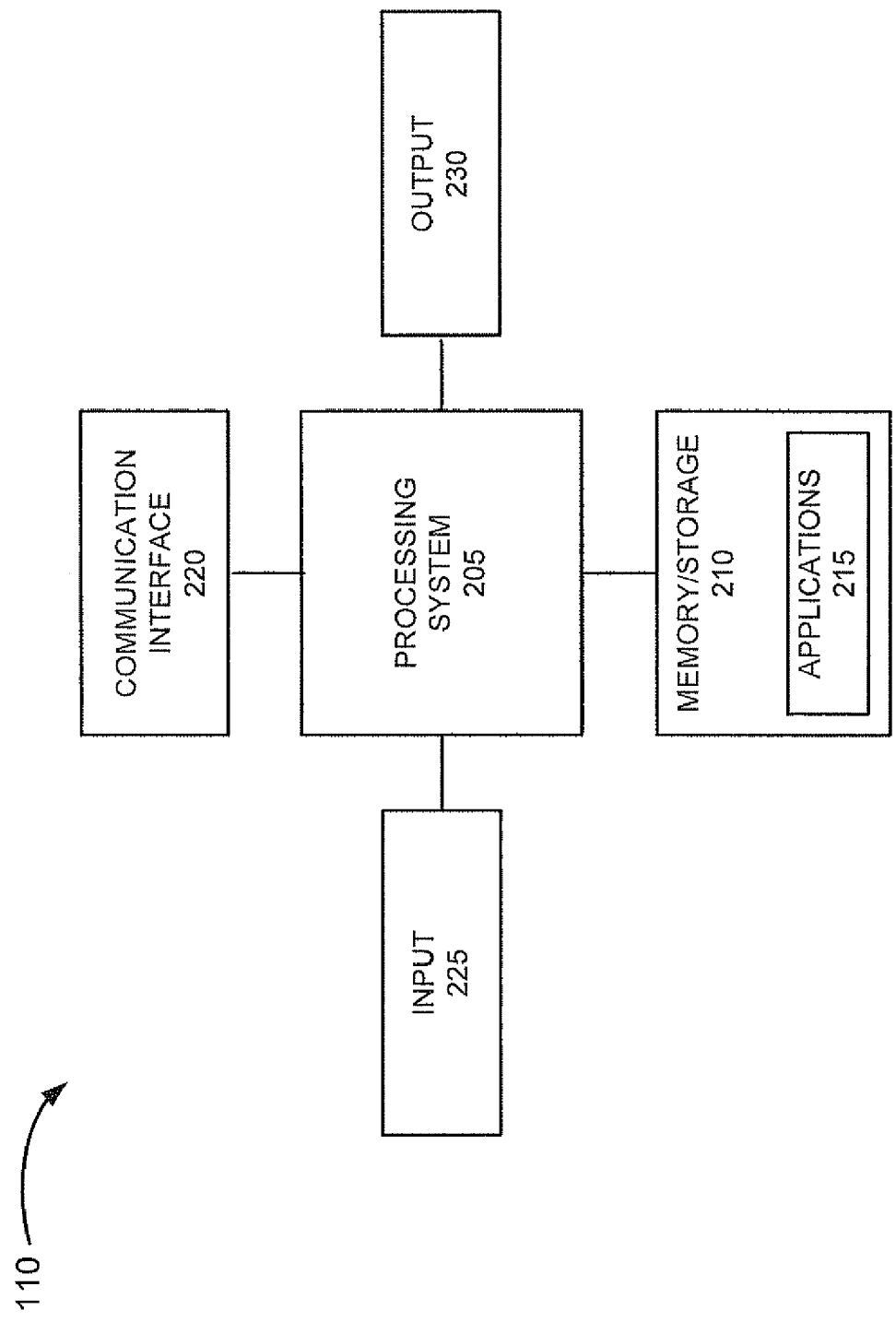

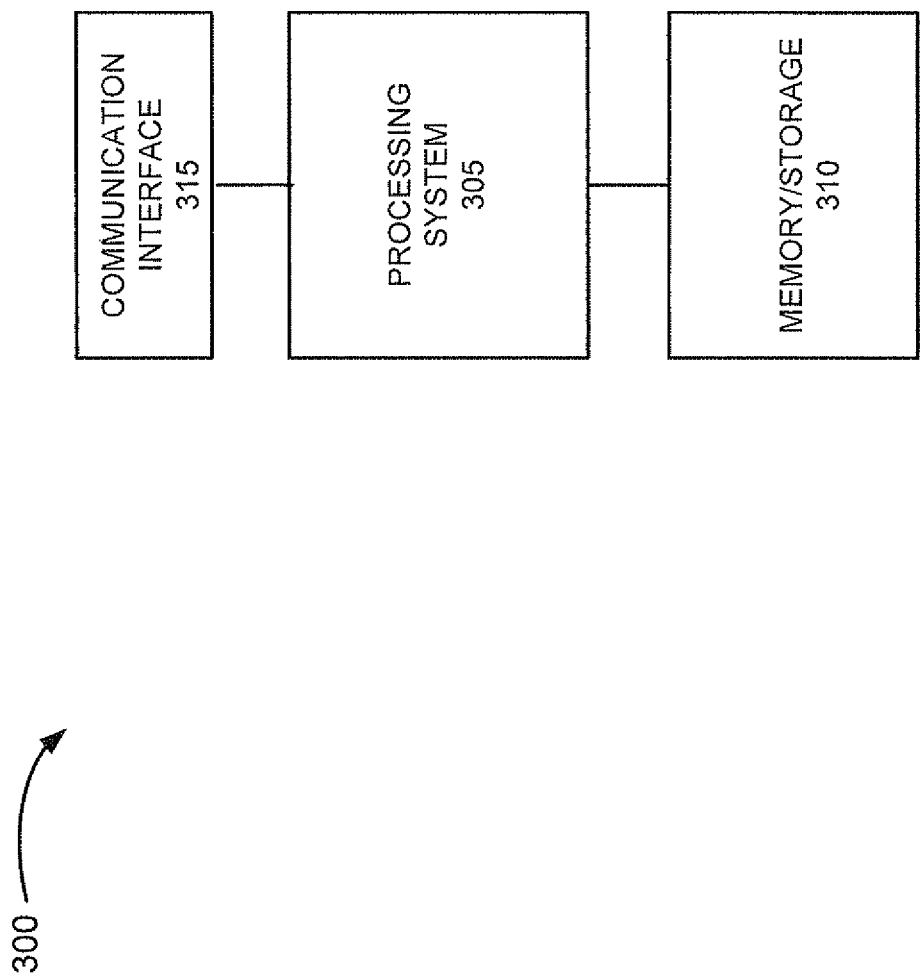

PRIORITY SERVICE SCHEME

BACKGROUND

Network operators and service providers afford to their customers a variety of services. These services may include data, voice, and multimedia. Regardless of the type of service, network operators and service providers try to offer their customers a certain level of quality of service (QoS). Despite these efforts, customers may experience connectivity problems and levels of service that are sub-standard due to various states within the network.

BRIEF DESCRIPTION OF THE DRAWINGS

FIG. 2 is a diagram of an exemplary components of the user device depicted in FIGS. 1A and 1B;

FIG. 3 is a diagram illustrating exemplary components of a device that may correspond to one or more of the devices and/or functional components depicted in FIG. 1B;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

The term "priority service," as used herein, is intended to be broadly interpreted to correspond to a level of service in which the delivery of content (e.g., data, video, voice, etc.) from source to destination is expedited compared to a lower level of service (e.g., normal service). For example, the expedition of delivery of content may include end-to-end call completion (e.g., avoid call or delivery failure (e.g., blocking) when the network suffers from high traffic congestion), enhanced routing, priority within the signaling network, prioritized queuing, and/or exemption from network management controls. The priority service may be applicable to wired network(s) and wireless network(s).

As will be described herein, a user may pay for a subscription to priority service. The subscription may provide for one or multiple levels of priority service. For example, a first priority level may correspond to a higher level of priority service than a second priority level. A user may request or invoke priority service on-demand. Additionally, a user that does not have a subscription for priority service, may still request or invoke priority service, on-demand. Upon authorization, the priority service may be billed to the non-subscription user according to the priority service provisioned.

Embodiments described herein relate to providing users with priority service. The priority service may be applied to various forms of communication, such as, for example, data (e.g., data transport, Web browsing, file transfer, e-mail, short messaging service (SMS), instant messaging, multimedia messaging service (MMS), or the like), voice (e.g., telephony, voice-over-Internet Protocol (VOIP), point-to-point, conferencing, or the like), and/or video services (e.g., point-to-point, conferencing, or the like). The priority service may be requested or invoked on-demand.

In instances when the user has a subscription to utilize priority service, priority service may be provisioned based on the user's subscription credentials. In other instances, when the user does not have a subscription to utilize priority service, the user may be offered, for example, a default priority service, a selection between different levels of priority service, or some other form of priority service (e.g., whatever priority service is available at the time).

Figure 1A:
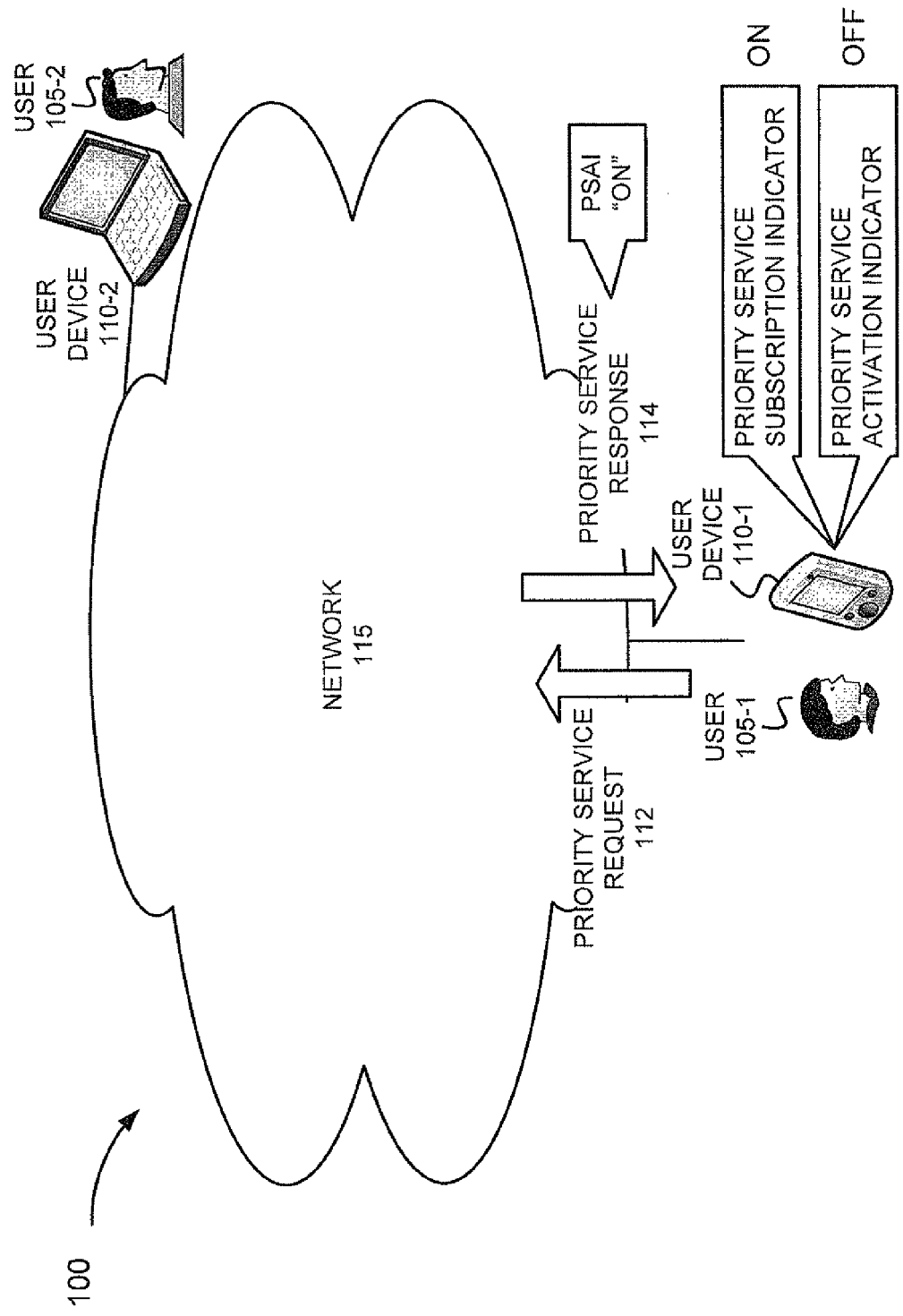
FIG. 1A is a diagram illustrating an exemplary overview of the provisioning of a priority service according to an exemplary implementation.

FIG. 1A is a diagram illustrating an exemplary overview of the provisioning of a priority service according to an exemplary implementation. As illustrated in FIG. 1A, an exemplary environment 100 may include users 105-1 and 105-2 (referred to generally as user(s) 105), user devices 110-1 and 110-2 (referred to generally as user device(s) 110), and a network 115. It will be appreciated that the number of devices, networks, and/or configuration in environment 100 is exemplary and provided for simplicity. In practice, environment 100 may include more, fewer, different, and/or differently arranged devices and/or networks than those illustrated in FIG. 1A. Also, in other implementations, some functions described as being performed by a particular device or network may be performed by a different device or network, or combination thereof. Environment 100 may include wired and/or wireless connections between the network and the devices illustrated.

User device 110 may include a device having communication capability. By way of example, user device 110 may include a wireless telephone (e.g., a mobile phone, a cellular phone, a smart phone), a computational device (e.g., a computer, a desktop computer, a laptop computer, a handheld computer), a personal digital assistant (PDA), a web-browsing device, a music playing device, a video playing device, a personal communication systems (PCS) device, a gaming device, a navigation device (e.g., a GPS-based device), a television (e.g., with a set top box and/or remote control), a vehicle-based device, and/or some other type of portable, mobile, handheld, or stationary communication device. Additionally, as will be described, user device 110 may include a component, which may be implemented in hardware, or a combination of hardware and software, to permit user 105 to request or invoke a priority service.

Network 115 may include one or multiple networks (wired and/or wireless) of any type. By way of example, network 115 may include a local area network (LAN), a wide area network (WAN), a telephone network, such as a Public Switched Telephone Network (PSTN), a Public Land Mobile Network (PLMN) or a cellular network, a satellite network, an intranet, the Internet, a data network, a private network, or a combination of networks. Network 115 may operate according to any number of protocols, standards (e.g., Global system for Mobile Communication (GSM), Code Division Multiple Access (CDMA), Long Term Evolution (LTE)), iterations (e.g., $2^{nd}$ generation, $3^{rd}$ generation, $4^{th}$ generation), etc.

According to an exemplary implementation, assume user 105-1 powers-on user device 110-1. Also assume that user 105-1 has a subscription to a priority service. After initial power-up procedures, user device 110-1 may recognize that user 105-1 has subscribed to the priority service. For example, user device 110-1 may recognize a priority service subscription indicator (PSSI). The PSSI may be implemented as data (e.g., in a database), which may be read by user device 110-1 and/or the PSSI may be associated with a program (e.g., the program may execute during start-up of user device 110-1). The PSSI may have two states—an "on" state or an "off" state. When the PSSI indicates an "on" state, user device 110-1 may recognize that user 105-1 has a subscription for priority service, and when the PSSI indicates an "off" state, user device 110-1 may recognize that user 105-1 does not have a subscription for priority service. Since user 105-1 has a subscription, the PSSI indicates an "on" state, as illustrated in FIG. 1A. In the instance that user 105-1 does not have a subscription to priority service, the PSSI would indicate an "off" state.

In addition to the PSSI, user device 110-1 may recognize the state of a priority service activation indicator (PSAI). The PSAI may indicate whether the network (e.g., network 115) has authorized user 105-1 to utilize the priority service. Similar to the PSSI, the PSAI may be implemented as data (e.g., in a database), which may be read by user device 110-1, and/or the PSAI may be associated with a program (e.g., the program may execute during start-up of user device 110-1). The PSAI may have two states—an "on" state or an "off" state. When the PSAI indicates an "on" state, user device 110-1 may recognize that priority service has been authorized by network 115. When the PSAI indicates an "off" state, user device 110-1 may recognize that priority service has not been authorized by network 115. As illustrated in FIG. 1A, after initial power-up procedures, the PSAI may indicate an "off" state. This may be the case regardless of whether user 105-1 has a subscription for priority service or not.

Subsequently, user 105-1 may desire to utilize priority service. For example, user 105-1 may wish to communicate with user 105-2. In such an instance, user 105-1 may invoke the priority service, on-demand. For example, user device 110-1 may provide a user interface (e.g., a button, a graphical user interface (GUI), voice recognition, or some other type of input mechanism) to permit user 105-1 to request the priority service. Upon user indication for priority service, user device 110-1 may transmit a priority service request 112 to network 115. Network 115 may receive and process priority service request 112 and determine, among other things, whether user 105-1 has a subscription for priority service. For example, network 115 may perform a look-up to verify authorization and/or subscription credentials.

For purposes of discussion, assume that network 115 determines that user 105-1 should be authorized to utilize priority service. When it is determined that user 105-1 is authorized for priority service, network 115 may identify, for example, a level of priority service, a quality of service (QOS), resource allocation and retention parameters, and/or the like. Upon such determinations, network 115 may provide a priority service response 114, as illustrated in FIG. 1A. In one implementation, priority service response 114 may cause the PSAI associated with user device 110-1 to change from an "off" state to an "on" state. Thereafter, user 105-1 may utilize the priority service to communicate with user 105-2. The PSAI may revert back to an "off" state in response to various occurrences (e.g., placement of a non-priority communication), as will be described in greater detail below.

As a result of the foregoing, the user device may permit the user to request or invoke a priority service, on-demand. This service may be provided to the user that has a priority service subscription and to a user that does not have a priority service subscription. Since embodiments and implementations have been broadly described, variations to the above embodiments and implementations will be discussed further below.

Figure 1B:
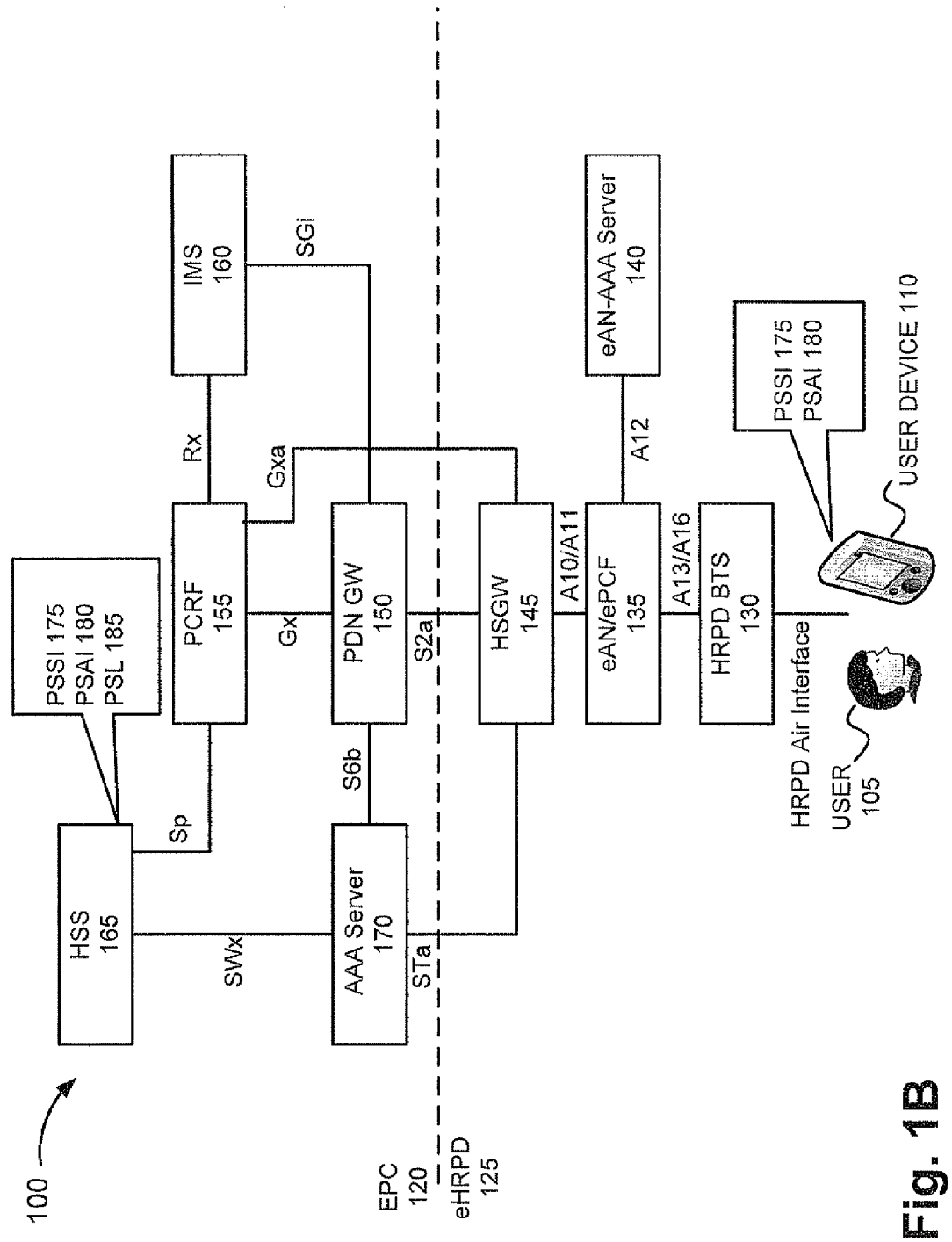
FIG. 1B is a diagram illustrating an exemplary environment in which devices, methods, and systems described herein may be implemented to provide the priority service.

FIG. 1B is a diagram illustrating an exemplary environment in which devices, methods, and systems described herein may be implemented to provide the priority service. As illustrated, environment 100 may include user 105 and user device 110, as previously described and illustrated with respect to FIG. 1A. As further illustrated in FIG. 1B, user device 110 may include a PSSI 175 and a PSAI 180, as previously described with respect to FIG. 1A.

Additionally, environment 100 may include an evolved packet core (EPC) network 120 and an enhanced high rate packet data (eHRPD) network 125, which collectively may correspond to network 115, as previously illustrated in FIG. 1A. eHRPD 125 may serve as an access network to EPC network 120, and EPC network 120 may serve as a core network. It will be appreciated, however, that network 115, such as, EPC network 120 and eHRPD network 125, may correspond to a variety of other types of networks. In this regard, the priority service scheme described herein is not platform dependent and may be implemented by a wide variety of network types.

As illustrated in FIG. 1B, eHRPD network 125 may include a HRPD base transceiver subsystem (BTS) 130, an enhanced access network (eAN)/enhanced packet control function (ePCF) 135, an enhanced access network (eAN) authentication, authorization, and accounting (AAA) server 140, and a high speed gateway (HSGW) 145. HRPD BTS 130, eAN/ePCF 135, eAN-AAA server 140, and HSGW 145 may operate according to a conventional HRPD network. FIG. 1B also illustrates exemplary interfaces (A10, A11, A12, A13, A16) associated with Code Division Multiple Access (CDMA)2000 that may be implemented within eHRPD network 125. In practice, other types of interfaces may be utilized. Additionally, eHRPD network 125, or more particularly, devices or functional components within eHRPD network 125, may perform various operations and/or functions associated with the priority scheme described herein. Such operations and/or functions will be described in greater detail below.

As further illustrated in FIG. 1B, EPC network 120 may include a packet data network (PDN) gateway (PDNGW) 150, a policy and charging rules function (PCRF) 155, an Internet Protocol Multimedia Subsystem (IMS) 160, a home subscriber service (HSS) 165, and a AAA server 170. PDNGW 150, PCRF 155, IMS 160, HSS 165, and AAA server 170 may operate in accordance with existing EPC networks. FIG. 1B also illustrates exemplary interfaces (S2a, Gx, Gxa, Rx, SGi, Sp, SWx, STa) associated with a fourth generation 4G standard, which may be implemented within EPC network 120. In practice, other types of interfaces may be utilized. Additionally, EPC network 120, or more particularly devices and/or functional components within EPC network 120, may perform various operations and/or functions associated with the priority scheme described herein. Such operations and/or functions will be described in greater detail below.

In one implementation, as illustrated in FIG. 1B, HSS 165 may store PSSI 175, PSAI 180, and a priority service level (PSL 185) for each user. PSSI 175 and PSAI 180 may correspond to the PSSI and the PSAI previously described with respect to FIG. 1A. PSL 185 may indicate a level for priority service. For example, user 105 may request or invoke different levels of priority service, such as, low, medium, or high. In other implementations, the priority scheme, as described herein, may only provide a single level of priority service. In such instances, PSL 185 may not be needed. In one implementation, when user device 110 powers on, PSSI 175 and PSAI 180 may be synchronized with or loaded from HSS 165 during a connectivity establishment phase. In this manner, PSSI 175 and PSAI 180 may match the states indicated in HSS 165.

FIG. 2 is a diagram illustrating exemplary components of user device 110. As illustrated, user device 110 may include a processing system 205, a memory/storage 210, a communication interface 220, an input 225, and an output 230. In other embodiments, user device 110 may include fewer, additional, and/or different components, or a different arrangement of components than those illustrated in FIG. 2 and described herein.

Processing system 205 may include a processor, a microprocessor, a data processor, a co-processor, a network processor, an application specific integrated circuit (ASIC), a controller, a programmable logic device, a field programmable gate array (FPGA), and/or some other component that may interpret and/or execute instructions and/or data. Processing system 205 may control the overall use of user device 110 based on an operating system and/or various applications. Processing system 205 may interpret and/or execute instructions and/or data.

Memory/storage 210 may include memory and/or secondary storage. For example, memory/storage 210 may include a random access memory (RAM), a dynamic random access memory (DRAM), a read only memory (ROM), a programmable read only memory (PROM), a flash memory, and/or some other type of memory. Memory/storage 210 may include a hard disk (e.g., a magnetic disk, an optical disk, a magneto-optic disk, etc.) or some other type of computer-readable medium, along with a corresponding drive. The term "computer-readable medium," as used herein, is intended to be broadly interpreted to include a memory, a secondary storage, a compact disc (CD), a digital versatile disc (DVD), or the like. The computer-readable medium may be implemented in a single device, in multiple devices, in a centralized manner, or in a distributed manner.

Memory/storage 210 may store data, application(s), and/or instructions related to the operation of user device 110. For example, memory/storage 210 may include a variety of applications 215, such as, for example, an e-mail application, a telephone application, a camera application, a video application, a multi-media application, a music player application, a visual voicemail application, a contacts application, a data organizer application, a calendar application, an instant messaging application, a texting application, a web browsing application, a location-based application (e.g., a GPS-based application), a blogging application, and/or other types of applications (e.g., a word processing application, a spreadsheet application, etc.).

Communication interface 220 may permit user device 110 to communicate with other devices, networks, and/or systems. For example, communication interface 220 may include an Ethernet interface, a radio interface, a microwave interface, and/or some other type of wireless and/or wired interface.

Input 225 may permit a user and/or another component to input information in user device 110. For example, input 225 may include a keyboard, a keypad, a display, a touchpad, a mouse, a button, a switch, a microphone, an input port, voice recognition logic, and/or some other type of visual, auditory, and/or tactile input component. Output 230 may permit user device 110 to output information to a user and/or another component. For example, output 230 may include a display, a speaker, light emitting diodes (LEDs), an output port, a vibrator, and/or some other type of visual, auditory, and/or tactile output component.

As previously described, user 105 may request or invoke priority service via user device 110. User device 110 may include a user interface to permit user 105 to request or invoke priority service. Additionally, user device 110 may include a user interface to permit user 105 to deactivate or revoke priority service, once priority service has been provisioned. For example, user 105 may wish to communicate with another user, utilizing priority service, and thereafter, user 105 may wish to communicate with some other user or the same user, without utilizing priority service.

In one implementation, the user interface may correspond to an application 215. Application 215 may permit user 105 to request or invoke priority service, on-demand. User 105 may interact with application 215 via an input component associated with input 225 and an output component associated with output 230. Application 215 may also permit user 105 to revoke or deactivate priority service in a similar manner. Application 215 may be executed by processing system 205. In other implementations, the user interface may correspond to an input component of input 225 to request or invoke priority service and deactivate or revoke priority service.

Additionally, or alternatively, network 115 (e.g., EPC network 120 and/or eHRPD network 125) may automatically request or invoke priority service and/or automatically deactivate or revoke priority service based on a user's communication. For example, user 105 may place a telephone call that is recognized as a priority call based on the telephone number dialed. In such instances, network 115 may request or invoke the priority service. Alternatively, user 105 may place a telephone call that is recognized as a non-priority call based on the telephone number dialed. In such instances, network 115 may deactivate or revoke the priority service. In one implementation, a database may be stored in network 115. The database may store information that includes priority telephone numbers. The priority telephone numbers may include emergency service numbers, telephone numbers having a unique sequence of digits, which may or may not include symbols (e.g., * or #). A telephone number that does not match a priority telephone number may be considered, by omission, a non-priority telephone number.

Additionally, as previously described, PSSI 175 and PSAI 180 may correspond to a state of user device 110. In one implementation, PSSI 175 and PSAI 180 may be represented as one or more bits of data that may be stored in memory/storage 210 (e.g., a database). In such an instance, user device 110 may operate corresponding to the indicated states associated with PSSI 175 and PSAI 180. In other implementations, PSSI 175 and PSAI 180 may correspond to a mode of user device 110. In such instances, user device 110 may not necessarily store values corresponding to PSSI 175 and PSAI 180.

FIG. 3 is a diagram illustrating exemplary components of a device 300 that may correspond to one or more of the devices and/or functional components in EPC network 120 and/or eHRPD network 125, as illustrated in FIG. 1B and described herein. As illustrated, device 300 may include a processing system 305, a memory/storage 310, and a communication interface 320. In other embodiments, device 300 may include fewer, additional, and/or different components, or a different arrangement of components than those illustrated in FIG. 3 and described herein.

Processing system 305 may include a processor, a microprocessor, a data processor, a co-processor, a network processor, an ASIC, a controller, a programmable logic device, a FPGA, and/or some other component that may interpret and/or execute instructions and/or data. Processing system 305 may control the overall operation of device 300. Processing system 305 may interpret and/or execute instructions and/or data.

Memory/storage 310 may include memory and/or secondary storage. For example, memory/storage 310 may include a RAM, a DRAM, a ROM, a PROM, a flash memory, and/or some other type of memory. Memory/storage 310 may include a hard disk (e.g., a magnetic disk, an optical disk, a magneto-optic disk, etc.) or some other type of computer-readable medium, along with a corresponding drive.

Memory/storage 310 may store data, application(s), and/or instructions related to the operation of device 300. For example, memory/storage 310 may include applications (not illustrated) related to communications within EPC network 120 and/or eHRPD network 125 in correspondence to respective devices and/or functional components illustrated in FIG. 1B. Additionally, memory/storage 310 may include applications (not illustrated) that perform various operations and/or functions associated with the priority scheme described herein. Such operations and/or functions will be described in greater detail below.

Communication interface 315 may permit device 300 to communicate with other devices, networks, and/or systems. For example, communication interface 315 may include an Ethernet interface, a radio interface, a microwave interface, or some other type of wireless and/or wired interface.

As previously described with respect to FIG. 1A, user 105 may request priority service. The figures that follow illustrate exemplary operations associated with the priority service scheme, as implemented in EPC network 120 and eHRPD network 125. In one embodiment, when user 105 has a subscription for priority service, user 105 may request or invoke the priority service based on an automatic activation scheme. In another embodiment, when user 105 has a subscription for priority service, user 105 may request or invoke the priority service based on a manual activation scheme. In still another embodiment, when user 105 does not have a subscription for priority service, user 105 may request or invoke the priority service based on a manual activation scheme. Additionally, as will be described, other embodiments will be described that relate to automatic and manual deactivation schemes to deactivate or revoke the priority service.

Depending on the communication requested by user 105, a priority signaling flow may or may not be needed. For example, when the communication involves video or voice, a priority signaling flow may be established before a priority bearer flow is established. On the other hand, when the communication involves, for example, texting (e.g., Short Messaging Service (SMS), Multimedia Messaging Service (MMS)), e-mail, or web-browsing, a file transfer, and the like, a priority signaling flow may not be needed.

The Session Initiation Protocol (SIP) will be described with respect to the priority scheme. In such an implementation, user device 110 may include a SIP client. It will be appreciated, however, that embodiments of the priority scheme are not dependent on the SIP. Rather, the priority scheme described herein may be implemented utilizing other protocols.

Figure 4:
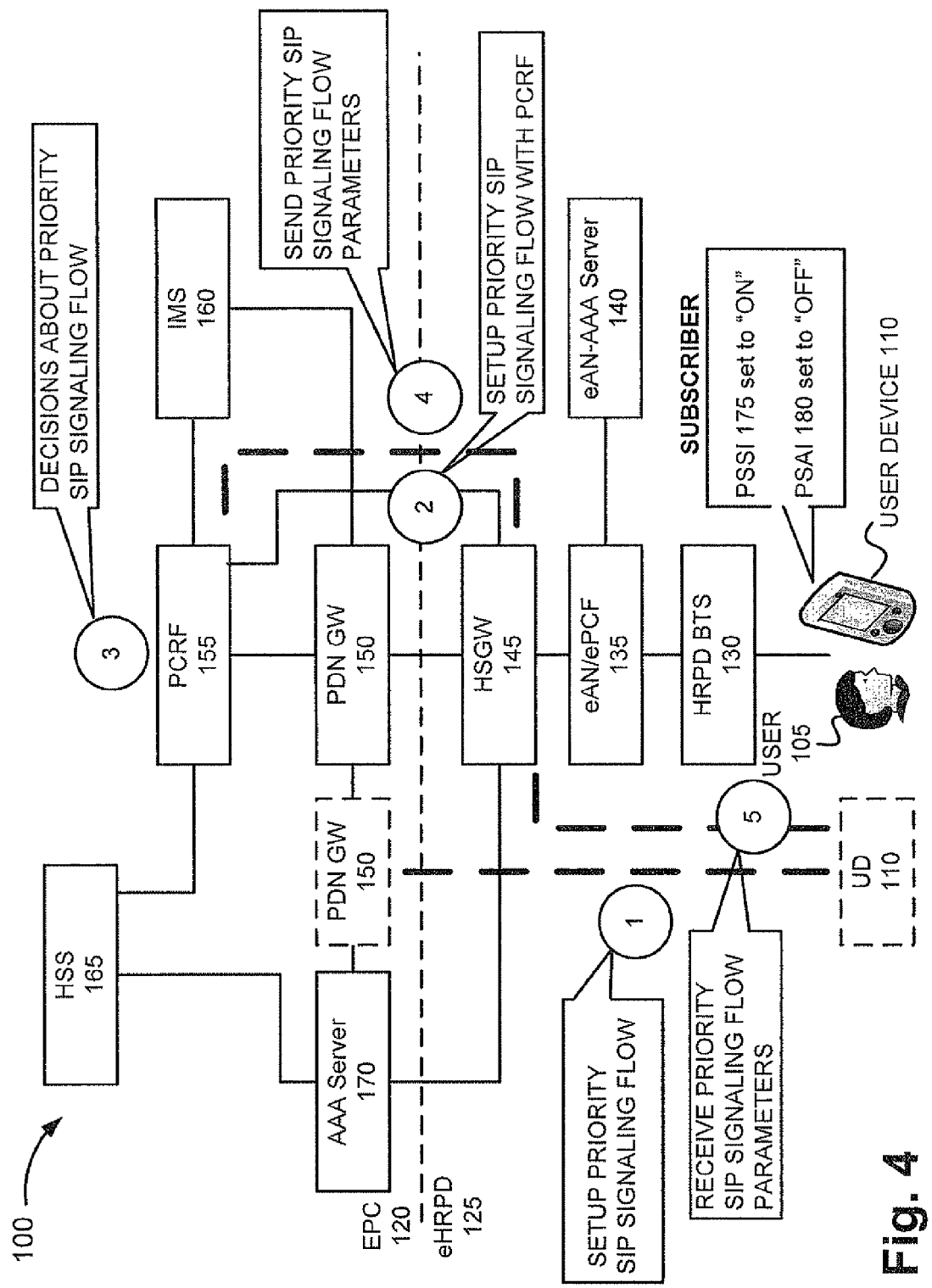
FIG. 4 is a diagram illustrating exemplary operations associated with the setting up of a priority signaling flow for a subscriber of priority services.

FIG. 4 is a diagram illustrating exemplary operations associated with the setting up of a priority signaling flow for a subscriber of priority services. The exemplary operations described correspond to the automatic activation scheme when user 105 is a subscriber of the priority service. As illustrated, an initial state associated with user device 110 may include PSSI 175 set to an "on" state (i.e., to indicate that user 105 is a subscriber of priority service) and PSAI 180 set to an "off" state (i.e., to indicate that priority service has not been activated).

For purposes of discussion, assume that user 105 wishes to request or invoke priority service. For example, user 105 may dial a priority dialing string (e.g., a special or non-standard telephone number) and press a send button. An IMS application or a VoIP/video application, which may need a priority signaling flow to be established, may be triggered or activated. The priority dialing string, entered by user 105, however, may not be output from user device 110 until the priority signaling flow is established.

As indicated by numeral (1) in FIG. 4, user device 110 may attempt to establish a priority SIP signaling flow to a dedicated (logical) PDN GW 150, having a specific access point name (APN), via HSGW 145. The APN may correspond to a network address of the dedicated (logical) PDN GW 150. For example, user device 110 may initially connect with HSGW 145 and transmit a SIP signaling establishment request message. In one implementation, the SIP signaling establishment request message may include PSSI 175 and PSAI 180 associated with user device 110 and/or user 105. The attempt to establish the priority SIP signaling flow may cause HSGW 145, as indicated by numeral (2), to conduct a gateway control session with PCRF 155, to establish a priority SIP signaling flow setup.

In response thereto, as indicated by numeral (3), PCRF 155 may determine whether to authorize the priority SIP signaling flow. For example, PCRF 155 may consult HSS 165 to determine a state of PSSI 175 and whether it matches the state of PSSI 175 with respect to user device 110. PCRF 155 may also determine a state of PSAI 180 and/or information associated with PSL 185. For example, when the state of PSAI 180 is in an "on" state, PCRF 155 may determine that a priority communication has already been established. In such an instance, another priority SIP signaling flow may not need to be established.

When PCRF 155 determines that the states of PSSI 175 match, PCRF 155 may recognize that user 105 is a subscriber to the priority service. PCRF 155 may determine to grant or deny the request to establish the priority SIP signaling flow based on PSSI 175, PSAI 175, and/or PSL 185. PCRF 155 may determine to grant or deny the request to establish the priority SIP signaling flow based on other types of user information (e.g., priority service subscription information, user profile information, etc.).

When PCRF 155 determines to grant the establishment of the priority SIP signaling flow, PCRF 155 may select parameters related to, for example, Quality of Service Class Identifier (QCI), allocation and retention policies (ARP), and/or the like. PCRF 155 may make these determinations based on user profile information and priority subscription information from HSS 165 and/or authorization, authentication, and accounting information from AAA server 170.

When PCRF 155 determines that the state of PSSI 175 in HSS 165 does not match the state of PSSI 175 with respect to user device 110, PCRF 155 may determine not to authorize the priority SIP signaling flow to user device 110. In an exemplary situation, the subscription for priority service may have been revoked subsequent to when user device 110 powered on. This may occur, for example, when user 105 leaves user device 110 turned on for a long period of time. For example, the state of PSSI 175 may be set to an "off" state on HSS 165 (e.g., user 105 did not pay his or her bill), while PSSI 175 may be set to an "on" state on user device 110. In this situation, PCRF 155 may deny establishment of the priority SIP signaling flow by sending a message to HSGW 145. HSGW 145 may communicate the denial to establish the priority SIP signaling flow to user device 110. PSSI 175 may be set to an "off" state on user device 110.

For purposes of discussion, assume that PCRF 155 determines to authorize the priority SIP signaling flow to user device 110. In such an instance, as indicated by numeral (4), PCRF 155 may send a response to HSGW 145. The response may include parameters (e.g., QCI, ARP, and/or the like) related to the establishment of the SIP signaling flow. When the response is received by HSGW 145, HSGW 145 may convert the parameters to an appropriate format and send the parameters to user device 110, as indicated by numeral (5). When the response is received by user device 110, user device 110 or HSGW 145 may utilize the parameters related to the priority SIP signaling flow and the priority SIP signaling flow may be established.

Figure 5:
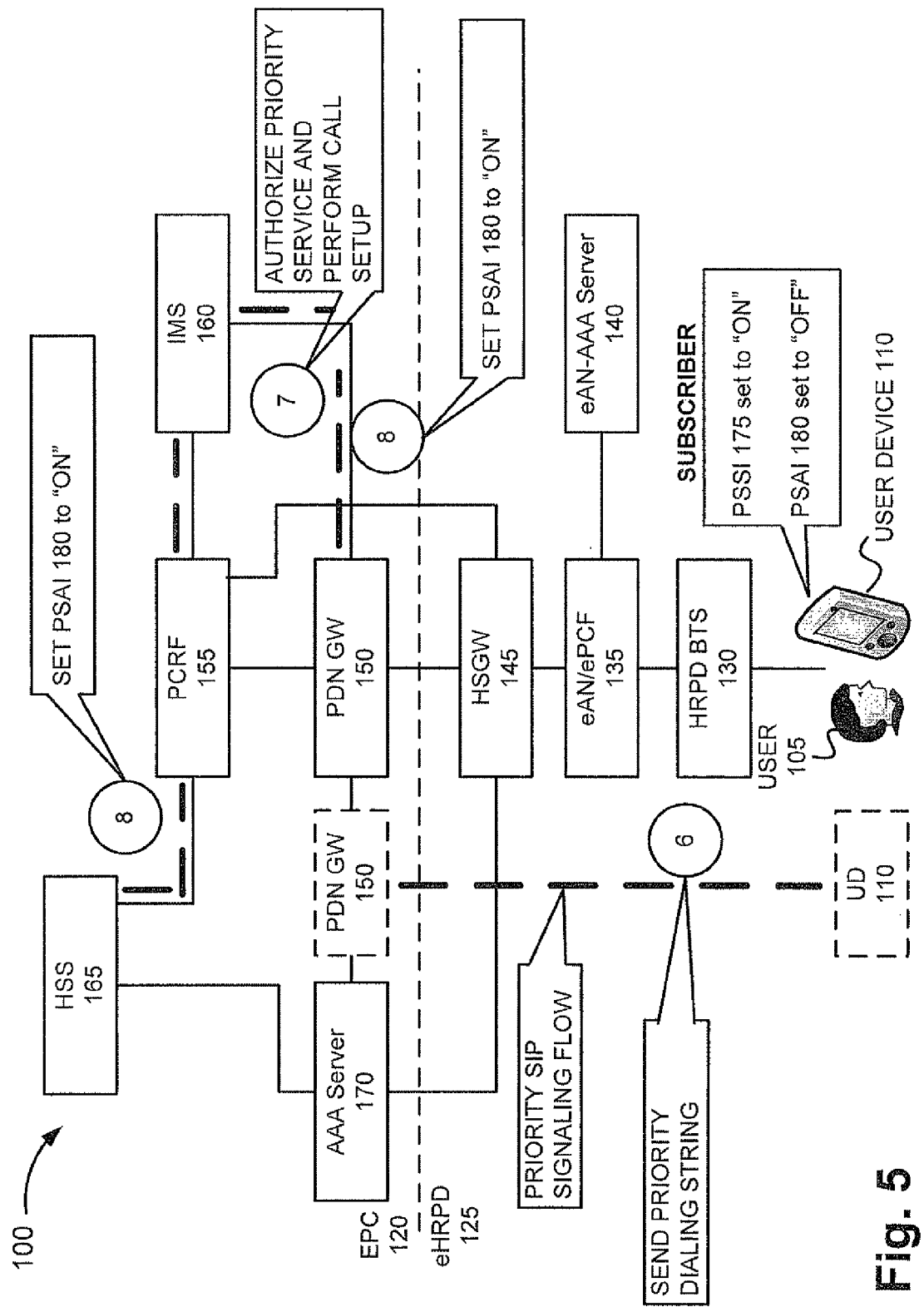
FIG. 5 is a diagram illustrating exemplary operations associated with the authorizing and the setting up of a priority communication for a subscriber of priority services.

FIG. 5 is a diagram illustrating exemplary operations associated with the authorizing and the setting up of a priority communication for a subscriber of priority services. In continuation with FIG. 4, when the priority SIP signaling flow has been established, the priority dialing string may be sent from user device 110, as indicated by numeral (6). For example, user device 110 may transmit a SIP INVITE message, which includes the priority dialing string, over the priority SIP signaling flow.

As indicated by numeral (7), IMS 160 may receive the priority dialing string to determine whether the priority dialing string is a priority communication. For example, when the priority dialing string corresponds to a conventional 10-digit telephone number, IMS 160 may determine that the communication is not a priority communication. On the other hand, when the priority dialing string includes or indicates (e.g., either by the number of digits or symbols in the string, or by the presence of one or more symbols in the string, or by a prefix included in the string, etc.) that the priority dialing string is a priority communication, then IMS 160 may determine that the communication is a priority communication. In one implementation, IMS 160 may consult or reference a database (not illustrated) that includes priority dialing strings. IMS 160 may compare the received priority dialing string from user device 110 with strings in the database to determine whether the received priority dialing string is a priority communication. In another implementation, IMS 160 may determine whether the received priority dialing string is a priority communication based on prefix codes, symbols, and/or other characteristics that distinguishes the string from a conventional or non-priority communication.

When IMS 160 determines that the priority dialing string corresponds to a priority communication, IMS 160 may notify HSS 165 and user device 110 to set PSAI 180 to an "on" state, as illustrated by numeral (8). Depending on network configuration, IMS 160 may notify other network devices to set PSAI 180 to an "on" state. Additionally, IMS 160 may proceed with call set-up with respect to another device (e.g., another user device 110 (not illustrated)).

On the other hand, when IMS 160 determines that the priority dialing string is not a priority communication, IMS 160 may notify HSS 165 and user device 110 to set PSAI 180 to an "off" state. Depending on network configuration, IMS 160 may notify other network devices to set PSAI 180 to an "off" state. IMS 160 may proceed with call set-up with respect to another device (e.g., another user device 110). IMS 160 may notify HSGW 145 to tear down the established priority SIP signaling flow.

Figure 6:
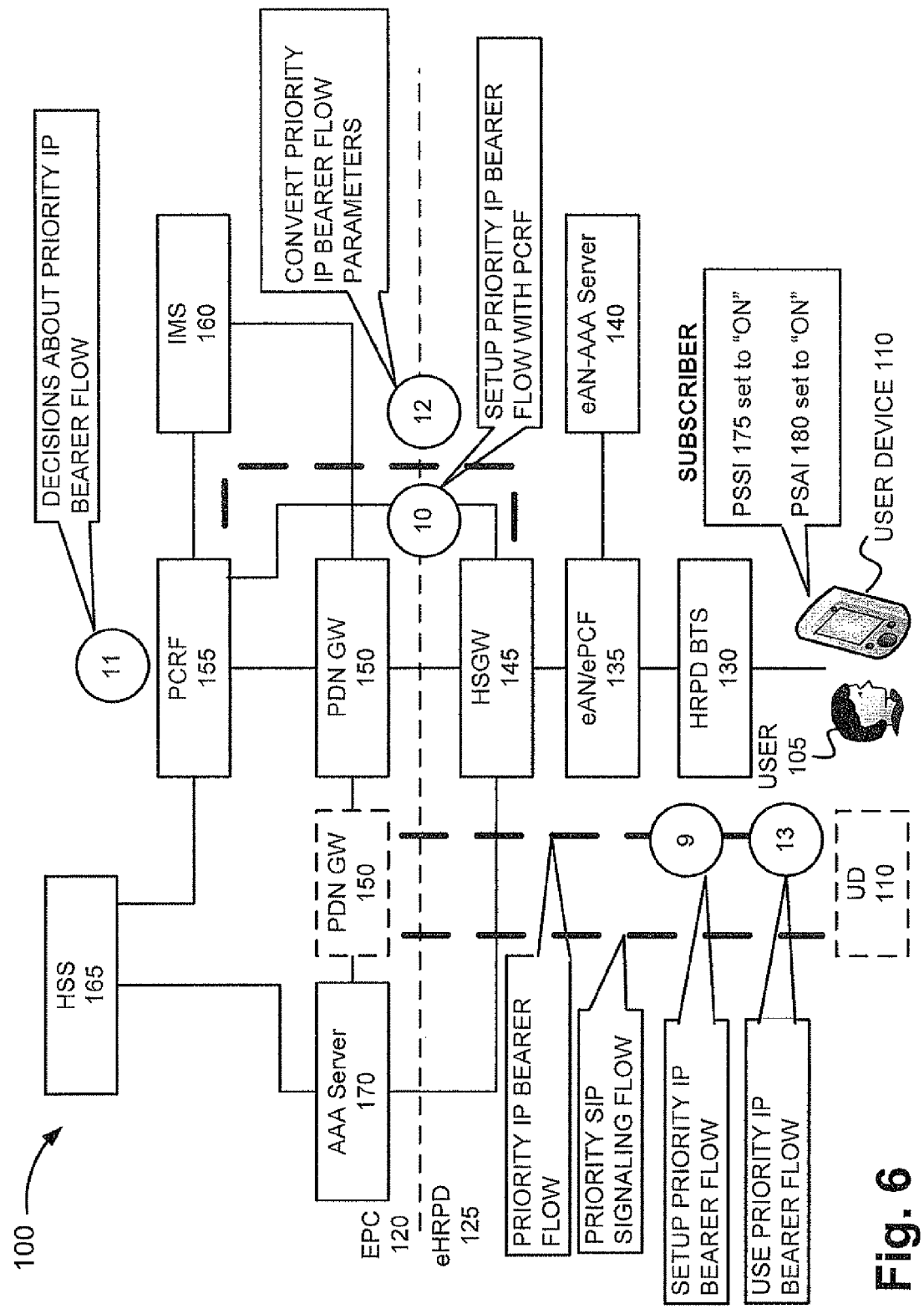
FIG. 6 is a diagram illustrating exemplary operations associated with the setting up of a priority bearer flow for a subscriber of priority services.

FIG. 6 is a diagram illustrating exemplary operations associated with the setting up of a priority bearer flow for a subscriber of priority services. As illustrated, user device 110 may have PSAI 180 indicating a state of "on," since the priority communication has been authorized.

As indicated by numeral (9), user device 110 may attempt to establish a priority IP bearer flow (e.g., for voice or video) with the dedicated (logical) PDN GW 150, having a specific APN, via HSGW 145. The attempt to establish a priority bearer flow may cause, as indicated by numeral (10), HSGW 145 to conduct a gateway control session with PCRF 155 to establish the priority IP bearer flow.

In response thereto, as indicated by numeral (11), PCRF 155 may select parameters related to, for example, QCI, ARP, and/or the like, with respect to the priority IP bearer flow. PCRF 155 may make these determinations based on user profile information from HSS 165 and/or authorization, authentication, and accounting information from AAA server 170.

PCRF 155 may send a response to HSGW 145, and when the response is received, HSGW 145 may convert the parameters to an appropriate format, as indicated by numeral (12). HSGW 145 may send the parameters to user device 110, and when the response is received by user device 110, user device 110 and/or HSGW 145 may utilize the parameters related to the priority IP bearer flow, as indicated by numeral (13). In this instance, the priority SIP signaling flow and the priority IP bearer flow has been established with respect to user device 110 and network 115. User device 110 may begin transmitting priority packets to another device (e.g., user device 110) via network 115. As a result of the invocation of priority service, user 105 may be afforded, among other things, a guaranteed bit rate (GBR), a very low packet delay budget, a very low packet error loss rate, and the like.

Figure 7:
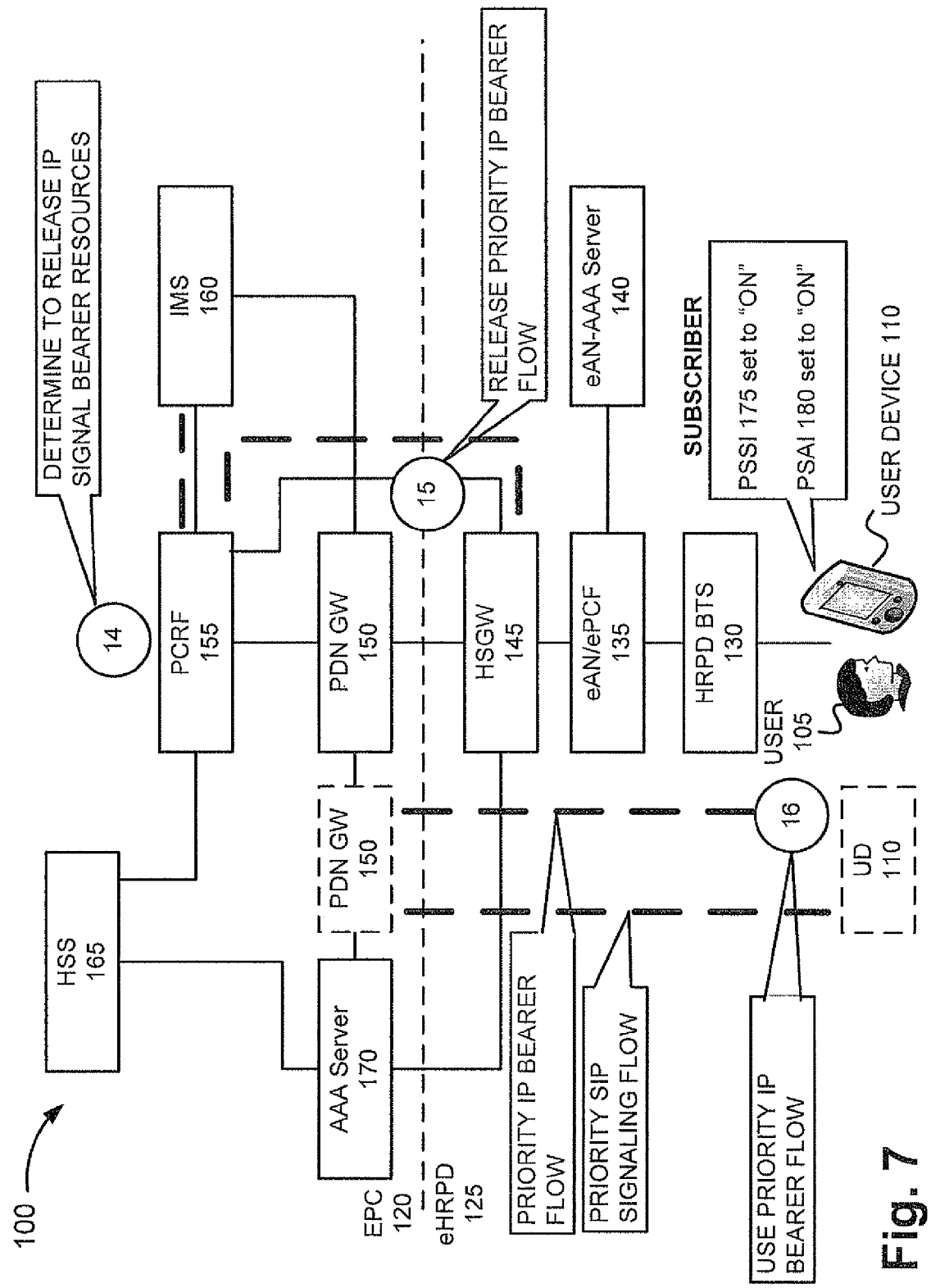
FIG. 7 is a diagram illustrating exemplary operations associated with a termination of a priority communication for a subscriber of priority services.

FIG. 7 is a diagram illustrating exemplary operations associated with a termination of a priority communication for a subscriber of priority services. By way of example, FIG. 7 illustrates exemplary operations when user 105 may end the priority communication (e.g., hangs up). As indicated by numeral (14), PCRF 155 may determine to release the priority IP bearer flow resources. For example, IMS 160 may notify PCRF 155 that the priority communication has terminated. In response thereto, PCRF 155 may notify PDN GW 150 and HSGW 145, as indicated by numeral (15), and user device 110, as indicated by numeral (16), to release (i.e., tear down) the priority IP bearer flow. As illustrated, in one implementation, PSSI 175 and PSAI 180 may remain in "on" states, and the priority service may remain activated. Additionally, the priority SIP signaling flow may remain up (i.e., the priority SIP signaling flow may not be torn down). In another example case, the priority communication may be terminated involuntarily (e.g., the priority communication is dropped, such as dropout). In an instance, both the priority IP bearer flow and the priority SIP signaling flow may be released. PSSI 175 may remain in an "on" state and PSAI 180 may be set to an "off" state.

Figure 8:
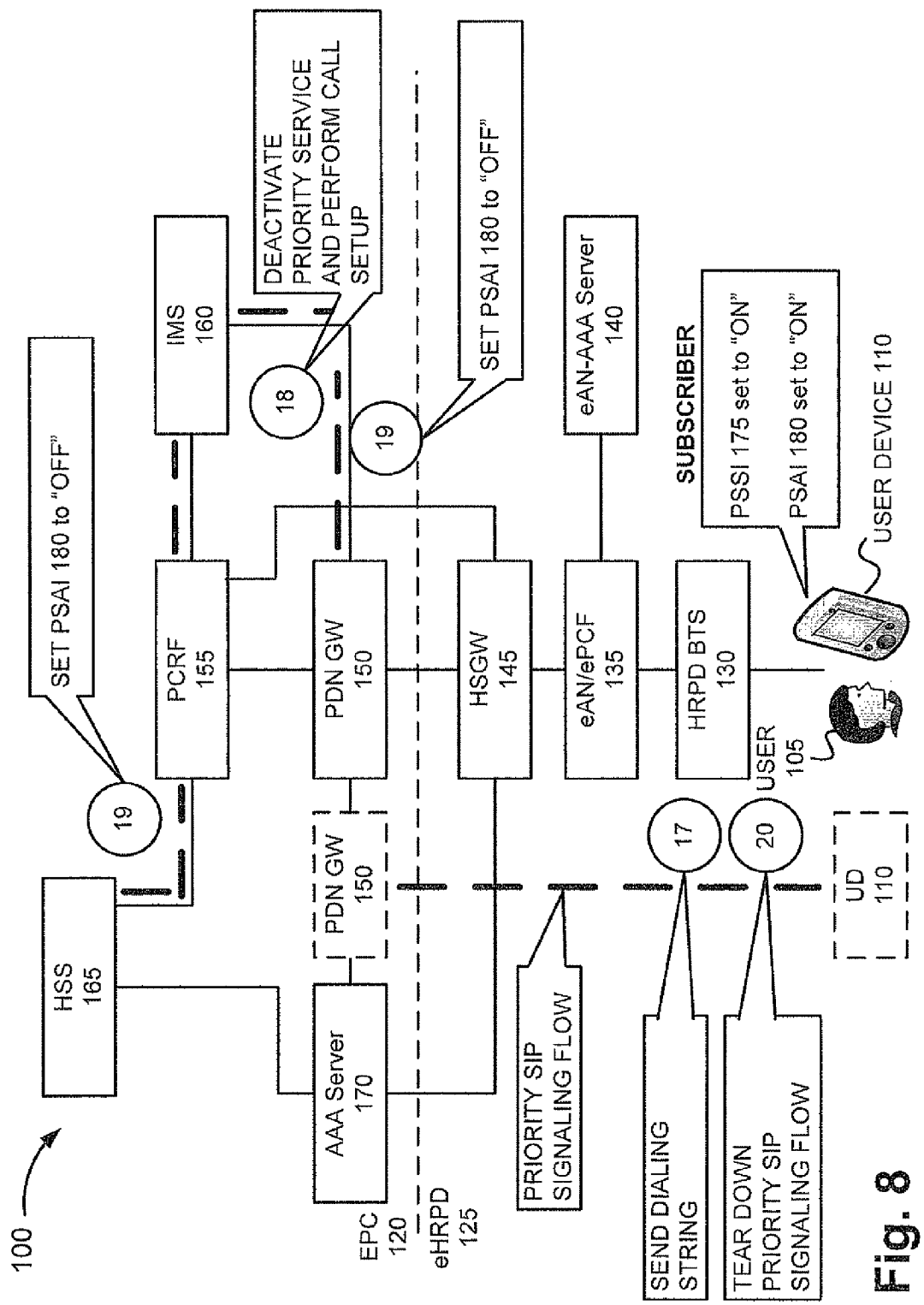
FIG. 8 is a diagram illustrating exemplary operations associated with the deactivation of the priority service for a subscriber of priority services.

FIG. 8 is a diagram illustrating exemplary operations associated with the deactivation of the priority service for a subscriber of priority services. In this example, it is assumed that user 105 wishes to establish a non-priority communication. For example, user 105 may dial a string (e.g., a non-priority telephone number) that is transmitted over the priority SIP signaling flow, as indicated by numeral (17). IMS 160 may receive the string and determine, in a manner previously described, that the string does not correspond to a priority communication, as indicated by numeral (18). In turn, as indicated by numeral (19), IMS 160 may set PSAI 180 to an "off" state in both HSS 165 and user device 110. Depending on network configuration, IMS 160 may also set PSAI 180 to an "off" state in other network devices. Additionally, IMS 160 may proceed with call set-up with respect to another device (e.g., another user device 110). Upon completion of the non-priority communication, IMS 160 may notify PCRF 155 and/or HSGW 145 to tear down or modify the priority SIP signaling flow into a normal SIP signaling, as indicated by numeral (20).

Figure 9:
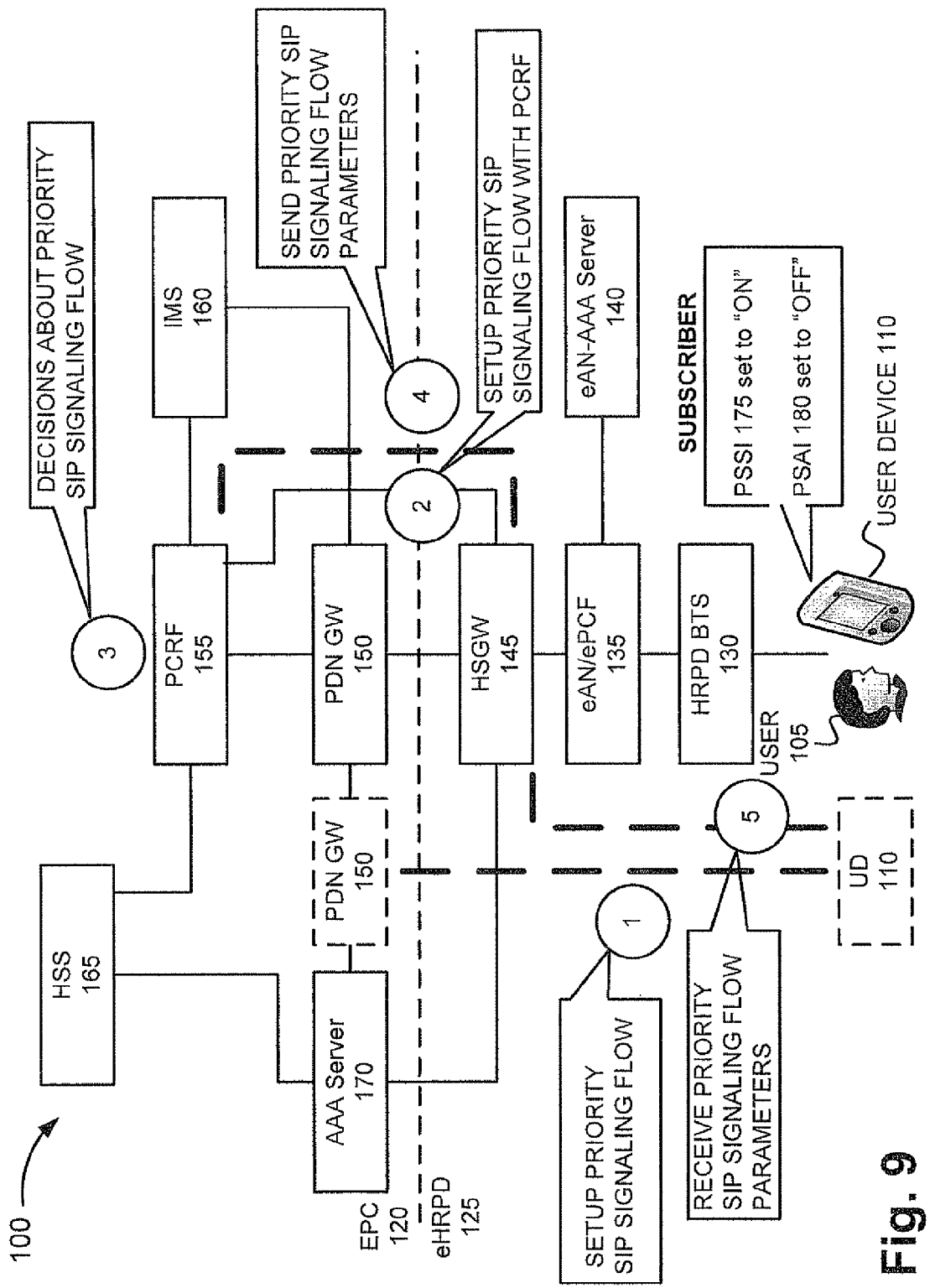
FIG. 9 is a diagram illustrating exemplary operations associated with the setting up of a priority signaling flow for a subscriber of priority services.

FIG. 9 is a diagram illustrating exemplary operations associated with the setting up of a priority signaling flow for a subscriber of priority services. Unlike the exemplary process in FIG. 4, in this embodiment, the priority signaling flow may be set up manually, instead of automatically, as previously described. For example, user 105 may execute a client activation program (e.g., a SIP client). User device 110 may receive user's 105 input to execute the client activation program and proceed to setup the priority SIP signaling flow in a manner similar to that previously described with respect to FIG. 4, as illustrated in FIG. 9.

Figure 10:
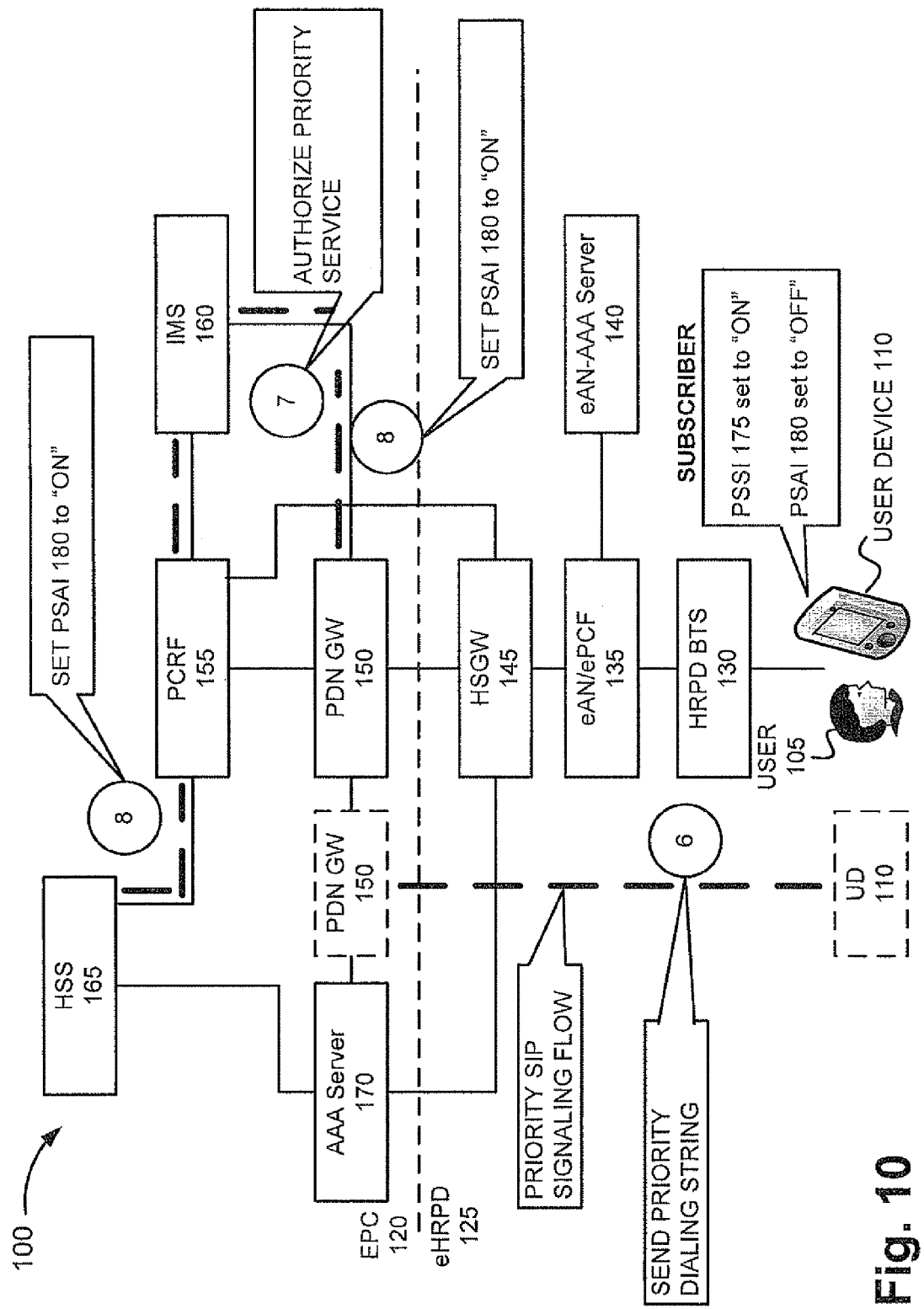
FIG. 10 is a diagram illustrating exemplary operations associated with the authorizing of a priority communication for a subscriber of priority services.

FIG. 10 is a diagram illustrating exemplary operations associated with the authorizing of a priority communication for a subscriber of priority services. Unlike the exemplary process in FIG. 5, the client activation program may transmit a priority dialing string (e.g., a dummy priority dialing string), as indicated by numeral (6) of FIG. 10, to permit the priority service to be activated and PSAI 180 to be set to an "on" state. In other implementations, instead of a dummy priority dialing string being utilized to activate the priority service, as described above, user 105 may be prompted to enter a priority dialing string once the priority SIP signaling flow has been established, as previously described with respect to FIG. 9. The remaining operations associated with FIG. 5 may be performed, as illustrated in FIG. 10. Depending on whether the dummy priority dialing string is utilized or user 105 enters the priority dialing string, IMS 160 may not or may, correspondingly, perform call set-up, as previously described in FIG. 5.

Once the priority SIP signaling flow is established, and PSAI 180 is set to an "on" state, user 105 may dial a priority dialing string (assuming user 105 has not done so already), an IMS or a VOIP application may be triggered or activated, and a priority IP bearer flow may be established in a manner similar to that previously described with respect to FIGS. 5 and 6. When IMS 160 receives the priority dialing string entered by user 105, IMS 160 may perform call set-up, as previously described. User device 110 may transmit priority packets over the priority IP bearer flow.

Depending on the communication requested by user 105, a priority signaling flow may not be needed for the priority communication. With respect to FIGS. 11-13, it will be assumed that the priority signaling flow may not be needed for the priority communication. For example, the communication may involve texting, e-mail, web-browsing, a file transfer, or the like. User 105 may request the priority service utilizing the manual activation scheme.

As will be described below, it is assumed, as an initial state, that PSSI 175 is set to an "on" state and PSAI 180 is set to an "off" state. In this case, since PSAI 180 is set to an "off" state, in one implementation, a temporary SIP signaling flow may be established. Once the temporary SIP signaling flow is established, a priority dialing string may be sent, by user device 110, to set PSAI 180 to an "on" state. After the PSAI 180 is set to an "on" state, a priority bearer flow may be established for priority communication (e.g., data, such as, e-mail, texting, web browsing, file transfer, or the like). Since the priority communication does not need the priority signaling flow, the priority signaling flow may subsequently be torn down.

In another implementation, user device 110 may establish a priority bearer flow, without having to establish a priority signaling flow, since the priority communication may not need the priority signaling flow. In such an implementation, a priority dialing string may be sent, by user device 110, to set PSAI 180 to an "on" state, along with a request to establish the priority bearer flow. When the priority communication is authorized, based on the priority dialing string, the priority bearer flow may be established. Thereafter, user device 110 may begin transmitting priority packets over the priority bearer flow.

In an alternate scenario, when PSSI 175 is set to an "on" state and PSAI 180 is already set to an "on" state, user device 110 may establish a priority IP bearer, as described herein.

As previously described, activation for priority service may be automatic or manual for a priority communication with respect to a subscriber of the priority service. Similar to that previously described, the priority service for a priority communication (e.g., texting, e-mail, web browsing, file transfer, or the like) may be activated, automatically or manually, in a manner similar to that of a priority communication (e.g., voice or video), as previously described. That is, in the automatic scheme, an IMS or a data application (e.g., e-mail, texting, web browsing, file transfer, or the like) may be triggered or activated. In the manual scheme, a client activation scheme program may be utilized to establish the priority SIP signaling flow and to set PSAI 180 to an "on" state.

Figure 11:
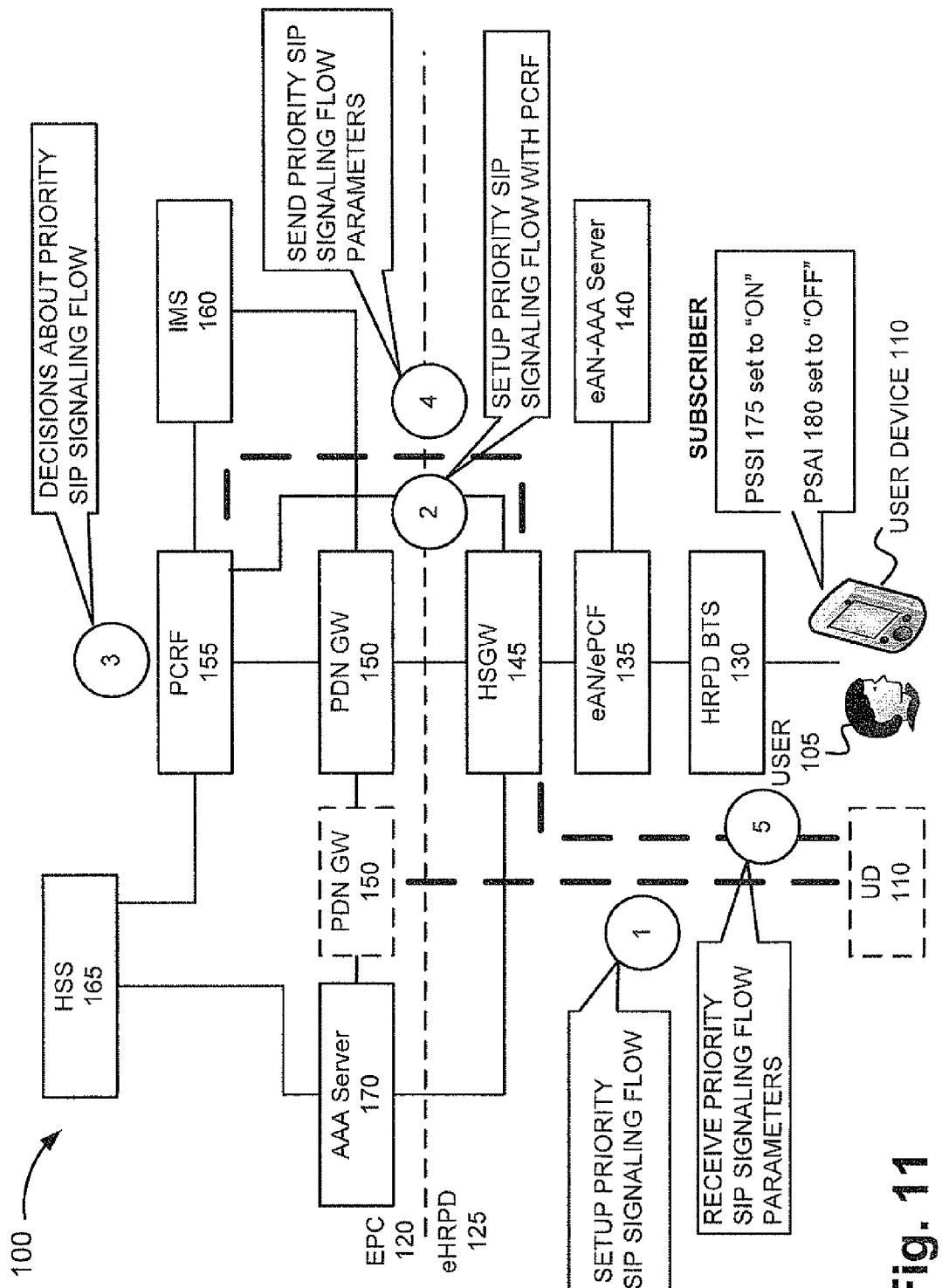
FIG. 11 is a diagram illustrating exemplary operations associated with the setting up of a priority signaling flow for a subscriber of priority services.
Figure 12:
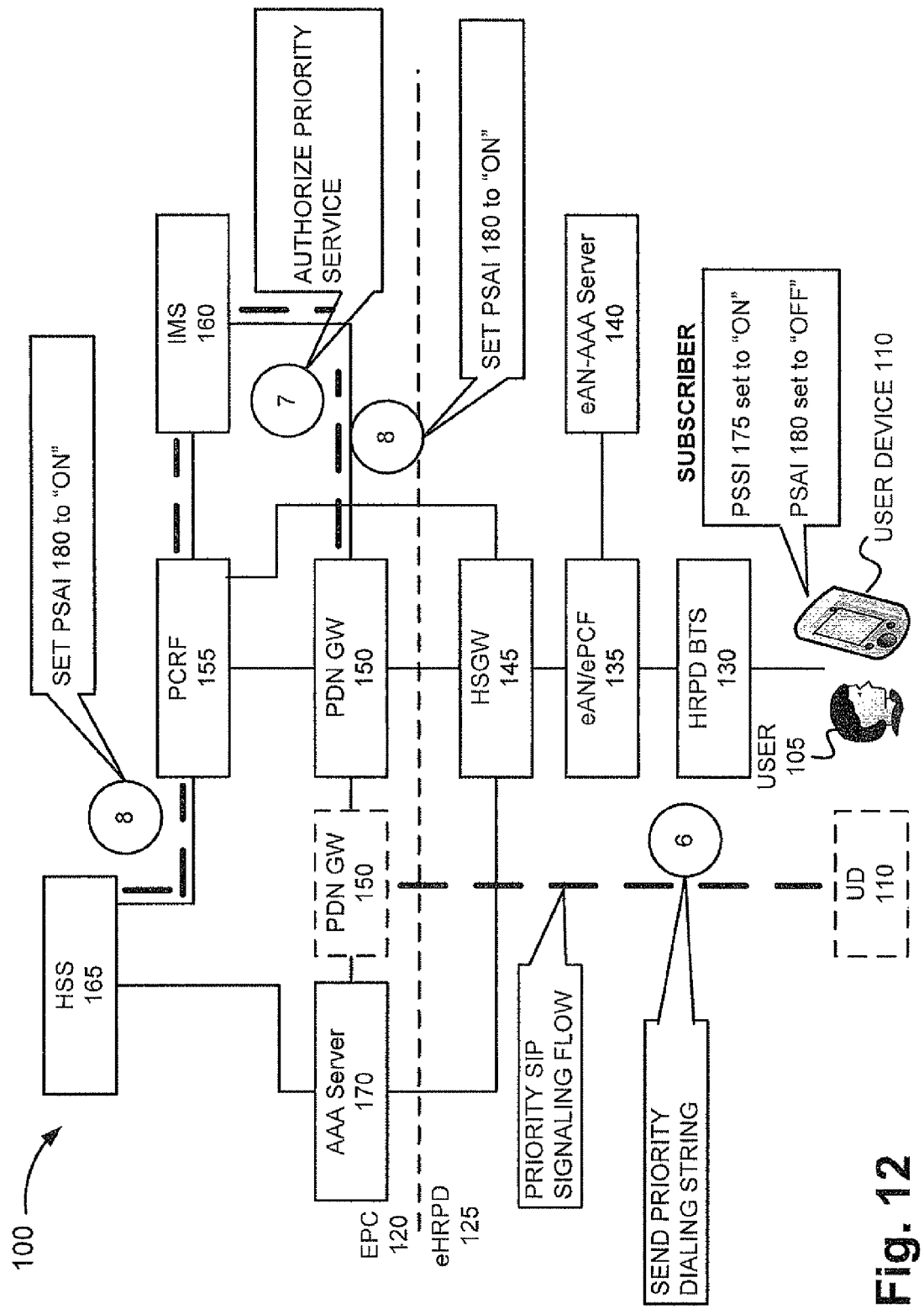
FIG. 12 is a diagram illustrating exemplary operations associated with the authorizing of a priority communication for a subscriber of priority services.

FIG. 11 is a diagram illustrating exemplary operations associated with the setting up of a priority signaling flow for a subscriber of priority services. In a manner similar to that previously described with respect to FIG. 4, user device 110 may establish a priority SIP signaling flow or modify a SIP signaling into a priority SIP signaling flow, as indicated by numerals (1), (2), (3), (4), and (5) of FIG. 11. FIG. 12 is a diagram illustrating exemplary operations associated with the authorizing of a priority communication for a subscriber of priority services. In a manner similar to that previously described with respect to FIG. 5, a priority dialing string may be transmitted to permit the priority service to be activated and PSAI 180 to be set to an "on" state, as indicated by numerals (6), (7), and (8) of FIG. 12. At this instance, the priority SIP signaling flow is established, and PSAI 180 may be set to an "on" state.

Figure 13:
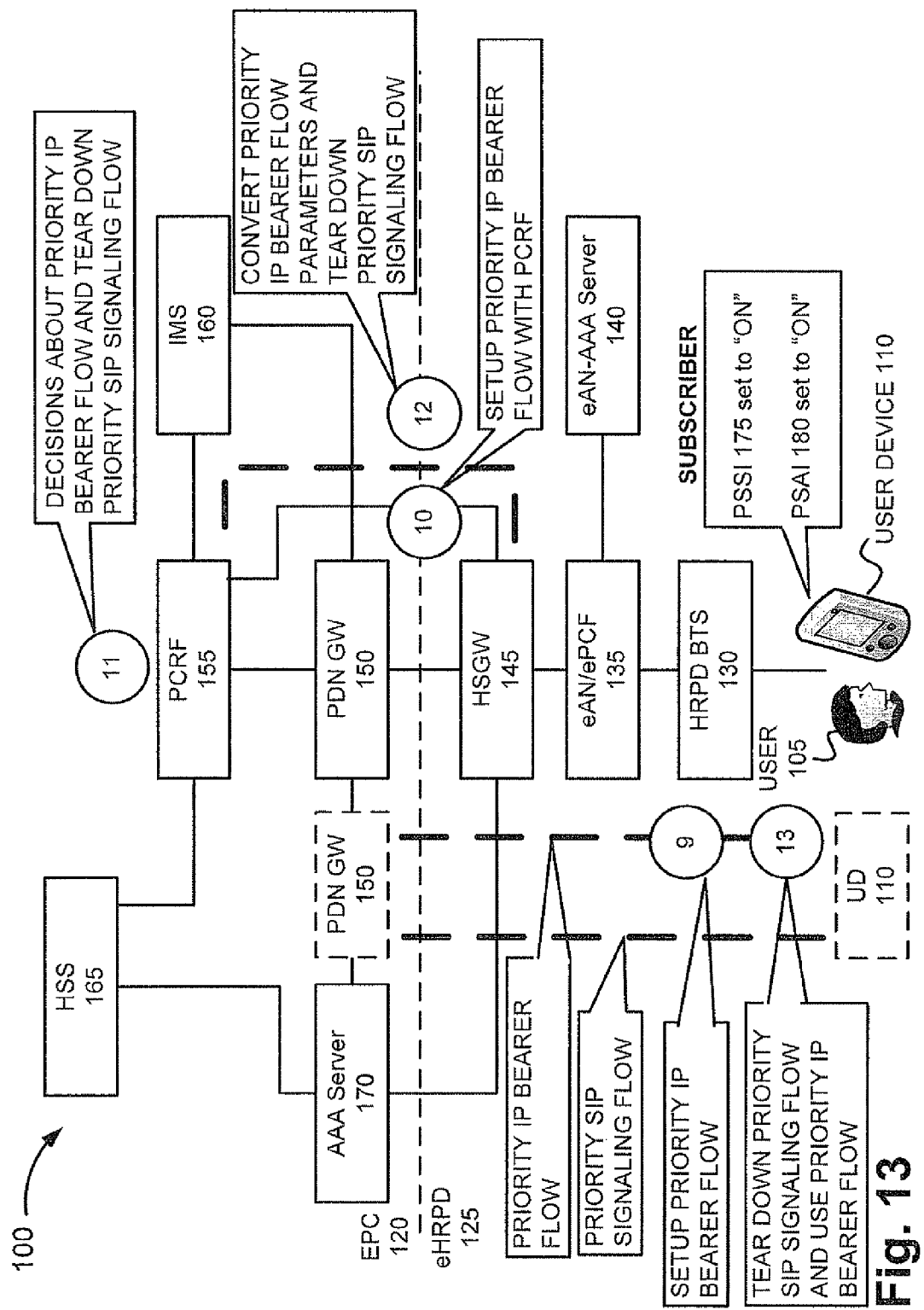
FIG. 13 is a diagram illustrating exemplary operations associated with the setting up of a priority bearer flow and a tearing down of the priority signaling flow for a subscriber of priority services.

FIG. 13 is a diagram illustrating exemplary operations associated with the setting up of a priority bearer flow and a tearing down of the priority signaling flow, for a subscriber of priority services. In a manner similar to that previously described with respect to FIG. 6, a priority bearer flow may be established, in addition to which, the priority SIP signaling flow may be torn down since the priority communication does not need the priority SIP signaling flow, as indicated by numerals (9), (10), (11), (12), and (13), of FIG. 13. As illustrated in FIG. 13, unlike the operations associated with respect to FIG. 6, PCRF 155 may recognize that the priority communication does not need the established priority SIP signaling flow (e.g., based on the priority IP bearer flow setup request). In such a case, PCRF 155 may not only select parameters (e.g., QCI, ARP, and/or the like) with respect to the priority IP bearer flow, but may also initiate the tearing down of the SIP signaling flow, as indicated by numeral (11) of FIG. 13. As further illustrated in FIG. 13, the decision to tear down the priority SIP signaling flow may propagate to user device 110, as indicated by numerals (12) and (13) of FIG. 13.

Once the priority IP bearer flow is established and PSAI 180 is set to an "on" state, user device 110 may begin transmitting priority packets over the priority IP bearer flow. Further, the termination and deactivation for the priority communication may be performed in a manner similar to that previously described with respect to FIGS. 7 and 8. However, as illustrated in FIG. 8 and described herein, since the priority SIP signaling flow has already been torn down, this operation may not be performed.

As previously described, in one embodiment, when user 105 does not have a subscription for priority service (i.e., a non-subscriber), user 105 may request or invoke the priority service based on a manual activation scheme. Similar to the subscriber, the non-subscriber may request or invoke a priority communication that may need a priority signaling flow (e.g., voice or video) or a communication that may not need a priority signal flow (e.g., texting, e-mail, file transfer, web browsing, file transfer, or the like). As will be described, it is assumed, as an initial state, that PSSI 175 is set to an "off" state (indicating that user 105 is non-subscriber of the priority service), and PSAI 180 is set to an "off" state (i.e., to indicate that priority service has not been activated).

In a manual activation (e.g., by the client activation program), by the non-subscriber, for a priority service which may not need a priority signaling flow, the priority SIP signaling flow and PSAI 180 may set to an "on" state, in a manner similar to that previously described with respect to FIGS. 9 and 10. Once the priority SIP signaling flow is established, and PSAI 180 is set to an "on" state, user 105 may dial a priority dialing string (e.g., for a texting application), an IMS or a data-based application (e.g., an e-mail application, a texting application, a file transfer application, a web browser, or the like) may be triggered or activated, and a priority IP bearer flow may be established in a manner similar to that previously described. Additionally, since the priority SIP signaling flow may not be needed for the priority communication, PCRF 155 may tear down the priority SIP signaling flow.

Figure 14:
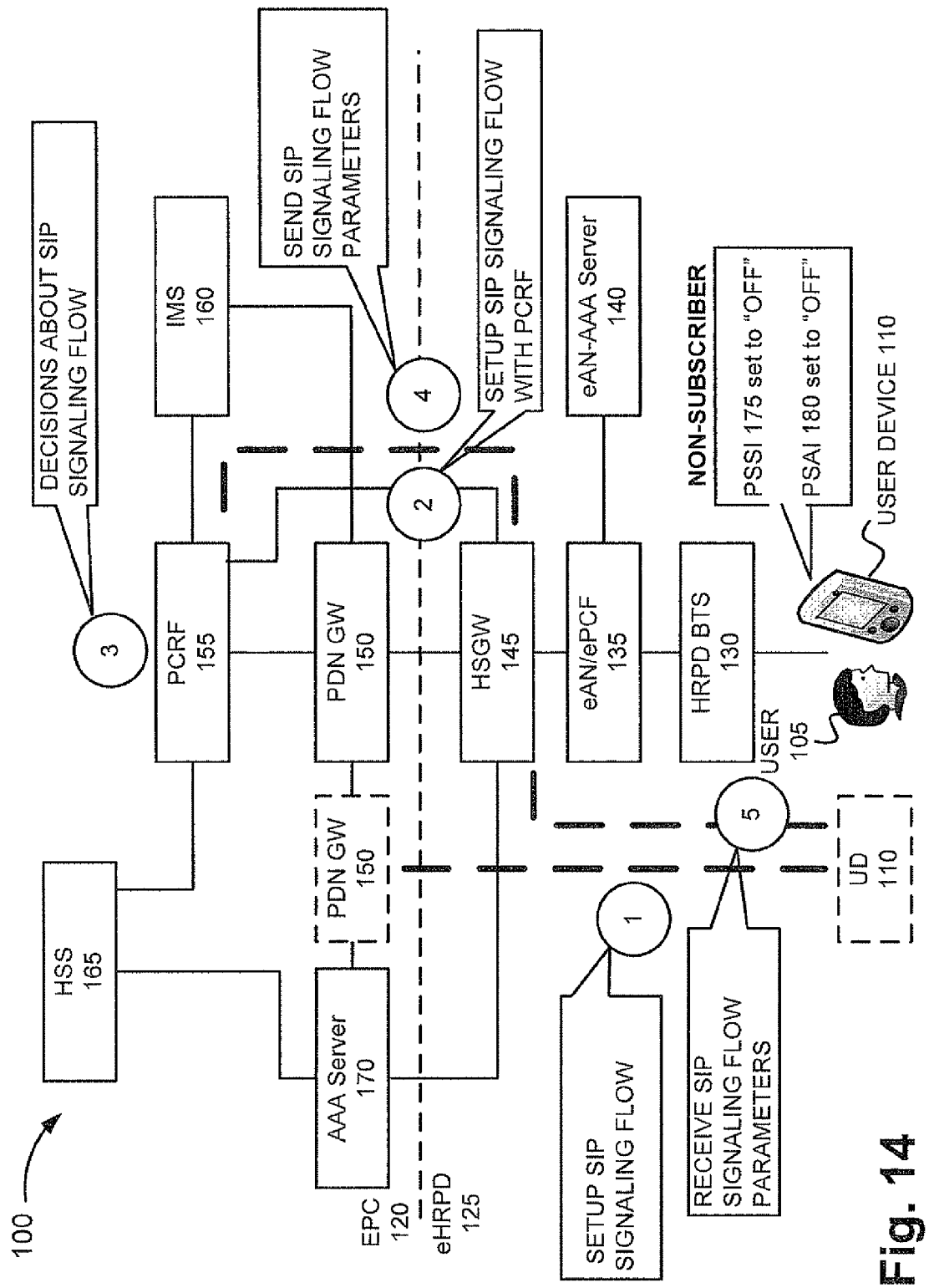
FIG. 14 is a diagram illustrating exemplary operations associated with the setting up of a signaling flow for a non-subscriber of priority services.

FIG. 14 is a diagram illustrating exemplary operations associated with the setting up of a signaling flow for a non-subscriber of priority services. The exemplary operations described correspond to a manual activation scheme. As illustrated, an initial state associated with user device 110 may include PSSI 175 set to an "off" state and PSAI 180 set to an "off" state. Further, unlike the subscriber, the non-subscriber may establish a non-priority or normal signaling flow versus a priority signaling flow.

For purposes of discussion, assume that user 105 wishes to request or invoke priority service. For example, user 105 may execute a client activation program (e.g., a SIP client). User device 110 may receive user's 105 input to execute the client activation program and proceed to setup the non-priority or normal SIP signaling flow in a manner as previously described with respect to FIG. 4, as indicated by numerals (1), (2), (3), (4), and (5) of FIG. 14.

Figure 15:
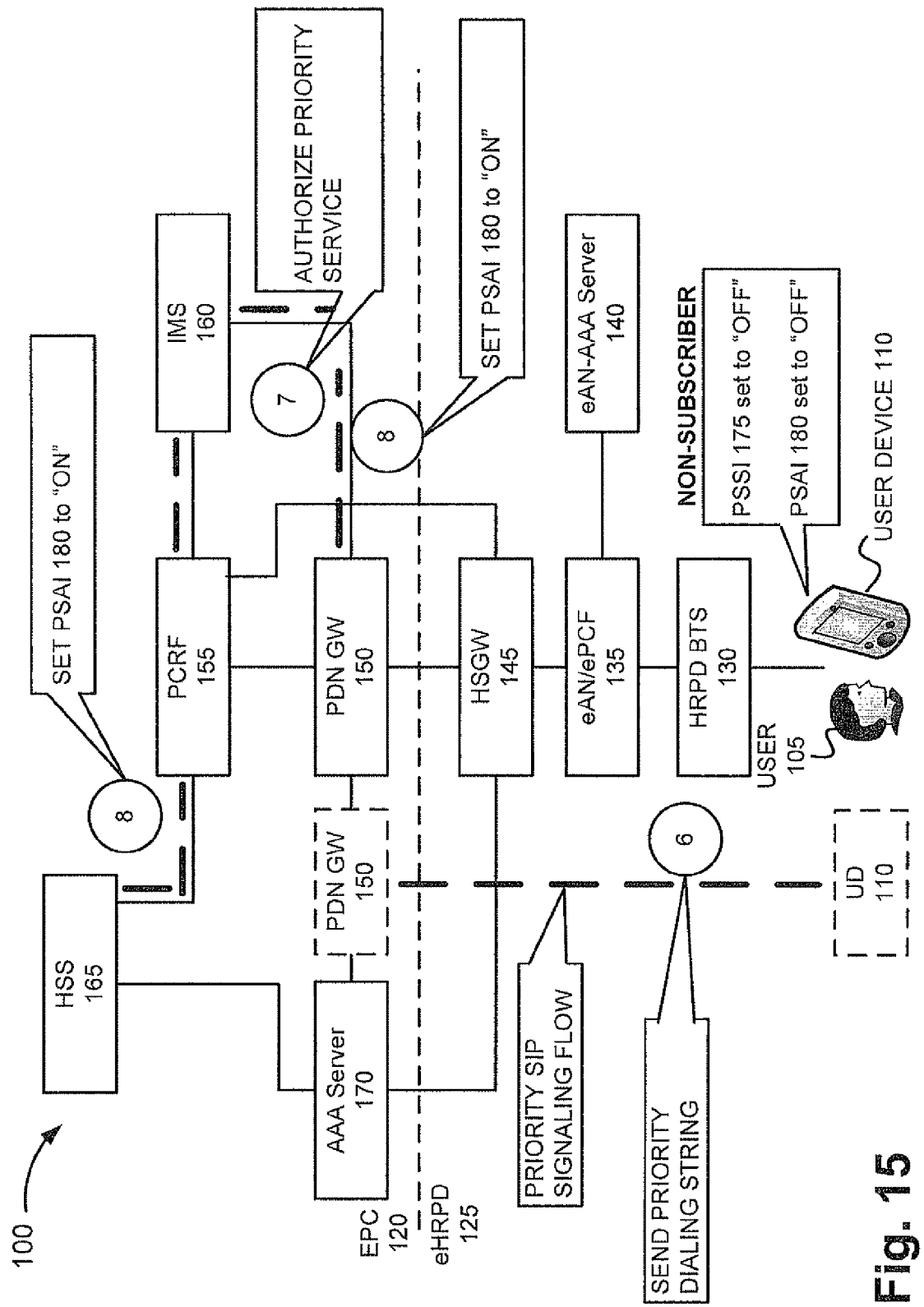
FIG. 15 is diagram illustrating exemplary operations associated with the authorizing of a priority communication for a non-subscriber of priority services.

FIG. 15 is a diagram illustrating exemplary operations associated with the authorizing of a priority communication for the non-subscriber of priority services. In continuation with respect to FIG. 14, once the non-priority or normal SIP signaling flow is established, the client activation program may transmit a priority dialing string (e.g., a dummy priority dialing string), as indicated by numeral (6) in FIG. 15, to permit the priority service to be activated and PSAI 180 to be set to an "on" state. The remaining operations associated with FIG. 5 may be performed, except the setting up of the priority communication, since the priority dialing string was a dummy priority dialing string. In other implementations, user 105 may enter a priority dialing string, as previously described, in which case, the remaining operations associated with FIG. 5 may be performed, including the setting up of the priority communication.

Once the non-priority or normal SIP signaling flow is established, and PSAI 180 is set to an "on" state, user 105 may establish a priority SIP signaling flow and a priority bearer flow, according to FIGS. 4-6, as previously described. When the priority SIP signaling flow is established, the non-priority or normal SIP signaling flow may be torn down. As a non-subscriber, user device 110 may then transmit priority packets related to the priority communication (e.g., voice or video) over the priority bearer flow.

The operations associated with the termination of the priority communication may be similar to that described with respect to FIG. 7. That is, when user 105 ends the priority communication (e.g., hangs up) or the priority communication is terminated (e.g., priority communication is dropped), PCRF 155 may determine to release the priority IP bearer flow resources (i.e., tear down the priority IP bearer flow). Further, the operations associated with the deactivation of the priority communication may be similar to that described with respect to FIG. 8. That is, when user 105 wishes to establish a non-priority communication, IMS 160 may receive the non-priority dialing string, determine that the string does not correspond to a priority communication, and set PSAI 180 to an "off" state in both HSS 165 and user device 110. Depending on network configuration, IMS 160 may also set PSAI 180 to an "off" state in other network devices. Additionally IMS 160 may proceed with call-setup with respect to another device (e.g., another user device 110). Upon completion of the non-priority communication, IMS 160 may notify PCRF 155 and/or HSGW 145 to tear down the priority SIP signaling flow.

As previously described, in some instances, the priority communication (e.g., texting, e-mail, web browsing, file transfer, or the like) may not need a priority signaling flow. The non-subscriber may invoke or request priority service for such a communication. For example, referring back to FIG. 14, the non-subscriber may establish a SIP signaling flow based on the execution of the client activation program. Once the SIP signaling flow is established, user device 110 may send a priority dialing string. In one implementation, the client activation program may transmit a priority dialing string to permit the priority service to be activated and PSAI 180 to be set to an "on" state. In other implementations, user 105 may enter a priority dialing string. At this instance, a normal or non-priority SIP signaling flow may be established and PSAI 180 may be set to an "on" state.

Figure 16:
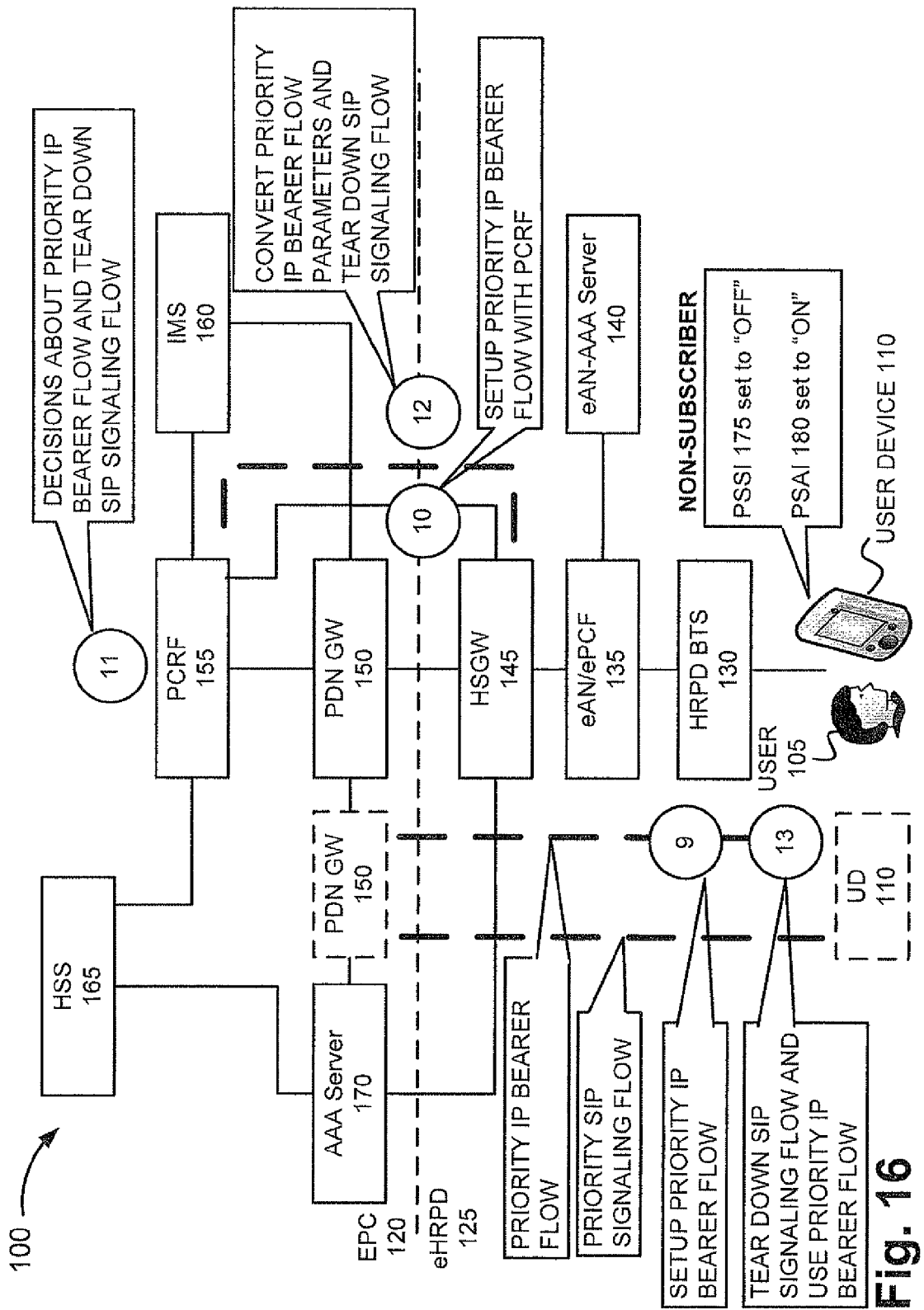
FIG. 16 is a diagram illustrating exemplary operations associated with the setting up of a priority bearer and a tearing down of the signaling flow, for a non-subscriber of priority services.

FIG. 16 is a diagram illustrating exemplary operations associated with the setting up of a priority bearer flow and a tearing down of the signaling flow, for a non-subscriber of priority services. In a manner similar to that previously described with respect to FIG. 6, a priority bearer flow may be established, in addition to which, the non-priority SIP signaling flow may be torn down since the priority communication does not need the non-priority SIP signaling flow, as indicated by numerals (9), (10), (11), (12), and (13), of FIG. 16. As further illustrated, unlike the operations associated with respect to FIG. 6, PCRF 155 may recognize that the priority communication does not need the established non-priority SIP signaling flow (e.g., based on the priority IP bearer flow setup request). In such a case, PCRF 155 may not only select parameters (e.g., QCI, ARP, and/or the like) with respect to the priority IP bearer flow, but may also initiate the tearing down of the non-priority SIP signaling flow, as indicated by numeral (11) of FIG. 16. As further illustrated in FIG. 16, the decision to tear down the non-priority SIP signaling flow may propagate to user device 110, as indicated by numerals (12) and (13) of FIG. 16.

Once the priority IP bearer flow is established and PSAI 180 is set to an "on" state, user device 110 may begin transmitting priority packets over the priority IP bearer flow. Further, the termination and deactivation for the priority communication may be performed in a manner similar to that previously described with respect to FIGS. 7 and 8. However, as illustrated in FIG. 8 and described herein, since the non-priority SIP signaling flow has already been torn down, this operation may not be performed.

Figure 17:
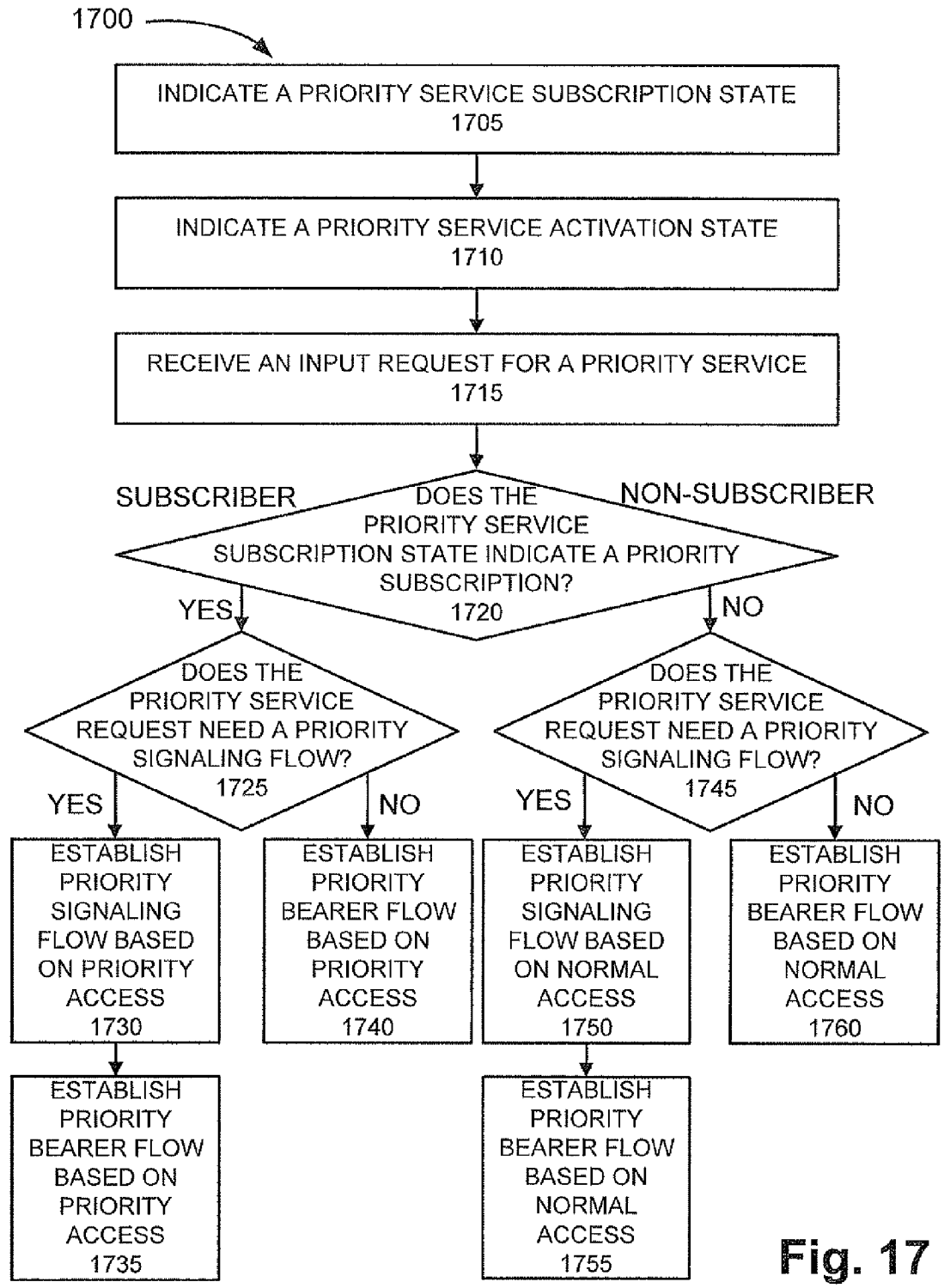
FIG. 17 is a flow diagram illustrating an exemplary process for requesting a priority service.

FIG. 17 is a diagram illustrating an exemplary process 1700 for requesting priority service. In one embodiment, process 1700 may be performed by user device 1 10. In other embodiments, one or more operations associated with process 1700 may be performed by a device in network 115.

Process may begin with indicating a priority service subscription state (block 1705). For example, as previously described, user device 110 may recognize the state of PSSI 175, which indicates whether user 105 is a subscriber to priority service. PSSI 175 may be implemented, for example, as data (e.g., in a database), which may be read by user device 110, and/or PSSI 175 may be associated with a program (e.g., the program may execute during a start-up of user device 110). PSSI 175 may have two states—an "on" state or an "off" state. When the PSSI 175 indicates an "on" state, user device 110 may recognize that user 105 has a subscription for priority service, and when PSSI 175 indicates an "off" state, user device 110 may recognize that user 105 does not have a subscription for priority service.

A priority service activation state may be indicated (block 1710). For example, as previously described, user device 110 may recognize the state of PSAI 180, which indicates whether priority service has been authorized. Similar to PSSI 175, PSAI 180 may be implemented, for example, as data (e.g., in a database), which may be read by user device 110, and/or PSAI 180 may be associated with a program (e.g., the program may execute during start-up of user device 110). PSAI 180 may have two states—an "on" state or an "off" state. When PSAI 180 indicates an "on" state, user device 110 may recognize that priority service has been authorized by network 115. When PSAI 180 indicates an "off" state, user device 110 may recognize that priority service has not been authorized by network 115.

An input request for priority service may be received (block 1715). Depending on the priority communication, for example, data (e.g., data transport, Web browsing, file transfer, e-mail, SMS, MMS, or the like), voice (e.g., (e.g., telephony, VOIP, point-to-point, conferencing, or the like), and/or video services (e.g., point-to-point, conferencing, or the like) and/or whether the request for priority service is automatic or manual, user device 110 may receive an input associated with input 225 to request or invoke priority service. The priority service for the priority communication may be requested or invoked on-demand.

It may be determined whether the priority service subscription state indicates a priority subscription (block 1720). For example, user device 110 may recognize whether PSSI 175 is in an "on" state or an "off" state.

When it is determined that PSSI 175 is in an "on" state (block 1720—YES), then it may be determined whether a priority signaling flow may be needed (block 1725). For example, as previously described, some communications (e.g., voice or video) may need a priority signaling flow to be established, while other communications (e.g., texting, e-mail, file transfer, web browsing, or the like) may not need a priority signaling flow. User device 110 may determine whether the priority communication may need a priority signaling flow based on the priority communication requested.

When it is determined that the priority signaling flow may be needed (block 1725—YES), then a priority signaling flow may be established (block 1730). As previously described, the priority signaling flow may be established according to an automatic scheme or a manual activation scheme.

A priority bearer flow may be established (block 1735). As previously described, once the priority signaling flow is established, whether according to the automatic scheme or the manual scheme, user device 110 may transmit a priority dialing string to receive authorization from network 115 and have PSAI 180 set to an "on" state. After the priority signaling flow is established and PSAI is set to an "on" state, a priority bearer flow may be established, as previously described above. Once the priority bearer flow is established, user device 110 may transmit priority packets according to the priority service.

Referring back to block 1725, when it is determined that the priority signaling flow may not be needed (block 1725—NO), then a priority bearer flow may be established (block 1740). As previously described, the priority bearer flow may be established according to an automatic scheme or a manual activation scheme. For example, as previously described, user device 110 may transmit a priority dialing string to receive authorization from network 115 and have PSAI 180 set to an "on" state. After the priority signaling flow is established and PSAI 180 is set to an "on" state, a priority bearer flow may be established, as previously described. Once the priority bearer flow is established, user device 110 may transmit priority packets according to the priority service. Additionally, the priority signaling flow may be torn down.

Referring back to block 1720, when it is determined that the priority service subscription state does not indicate a priority subscription (block 1720—NO), then it may be determined whether a priority signaling flow may be needed (block 1745). For example, as previously described, some communications (e.g., voice or video) may need a priority signaling flow, while other communications (e.g., texting, e-mail, file transfer, web browsing, or the like) may not need a priority signaling flow. User device 110 may determine whether the priority communication may need a priority signaling flow based on the priority communication requested.

When it is determined that the priority signaling flow may be needed (block 1745—YES), then a priority signaling flow may be established (block 1750). As previously described, the priority signaling flow may be established according to a manual activation scheme. In one implementation, a non-priority signaling flow may be established and user device 110 may transmit a priority dialing string to receive authorization from network 115 and to have PSAI 180 set to an "on" state. User device 110 may then establish the priority signaling flow and the non-priority signaling flow may be torn down, as previously described.

A priority bearer flow may be established (block 1755). As previously described, once the priority signaling flow is established and PSAI 180 is set to an "on" state, user device 110 may establish a priority bearer flow, as previously described. Once the priority bearer flow is established, user device 110 may transmit priority packets according to the priority service.

Referring back to block 1745, when it is determined that the priority signaling flow may not be needed (block 1745—NO), then a priority bearer flow may be established (block 1760). For example, as previously described, a non-priority signaling flow may be established and user device 110 may transmit a priority dialing string to receive authorization from network 115 and have PSAI 180 set to an "on" state. User device 110 may establish a priority bearer flow and tear down the non-priority signaling flow. Once the priority bearer flow is established, user device 110 may transmit priority packets according to the priority service.

Although FIG. 17 illustrates an exemplary process 1700, in other implementations, fewer, additional, and/or different operations may be performed. For example, depending on the state of PSAI 180 (i.e., when PSAI 180 is already set to an "on" state), user device 110 may perform different operations than those described in process 1700, in which PSAI 180 may be in an "off" state and may need to be set to an "on" state. Additionally, or alternatively, depending on whether user 105 is a subscriber or non-subscriber and the type of priority communication, one or more operations of process 1700 may be omitted and/or executed in a different order, as previously described herein.

Figure 18A:
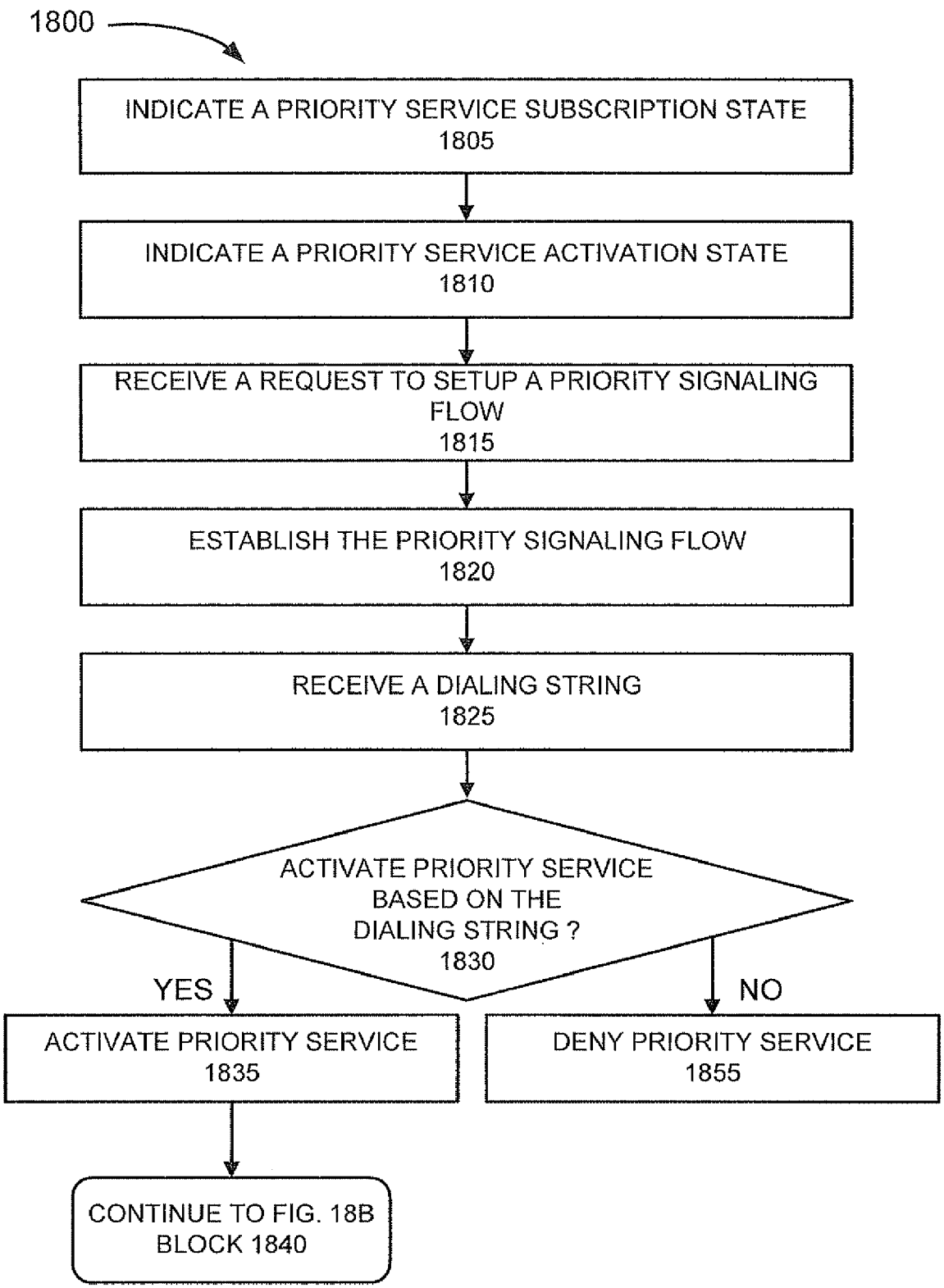
FIGS. 18A and 18B are flow diagrams illustrating an exemplary process for providing a priority service.
Figure 18B:
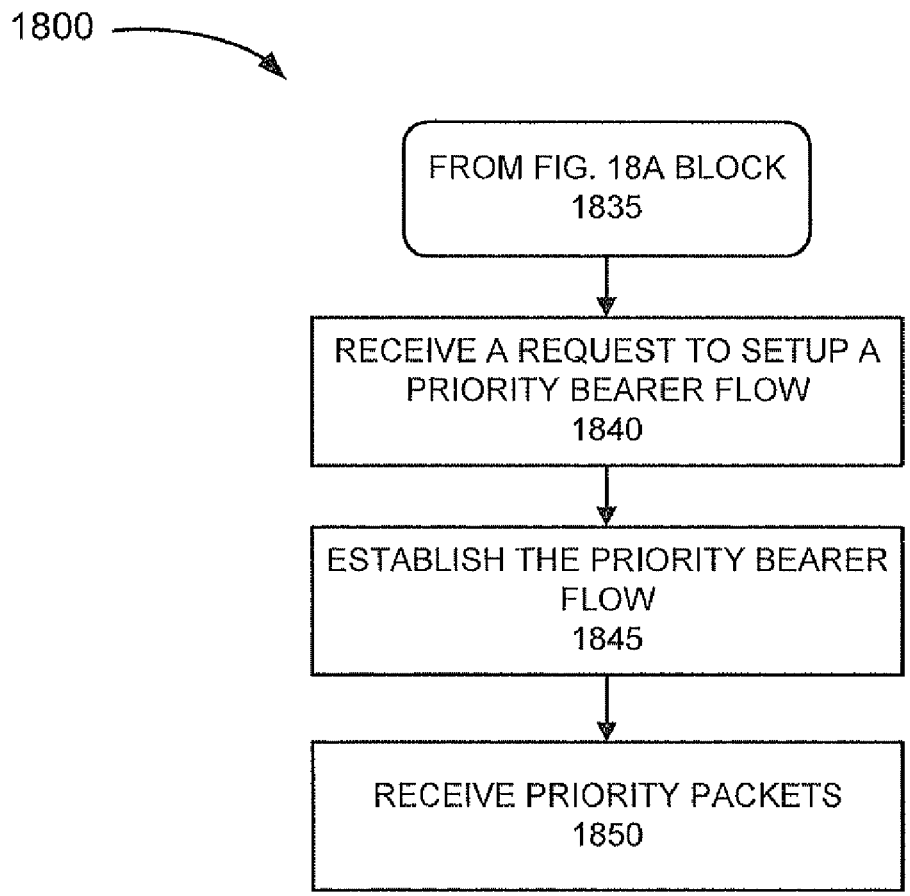

FIGS. 18A and 18B are diagrams illustrating an exemplary process 1800 for providing priority service. In one embodiment, process 1800 may be performed by one or more devices of network 115. In other embodiments, one or more operations associated with process 1800 may be performed by user device 110.

A priority service subscription state may be indicated (block 1805). For example, as previously described, HSS 165 may store PSSI 175 for each user 105. PSSI 175 may indicate whether user 105 is a subscriber to priority services or not. HSS 165 may store PSL 185. PSL 185 may indicate different levels of priority service to which user 105 has subscribed or may be afforded.

A priority service activation state may be indicated (block 1810). For example, as previously described HSS 165 may store PSAI 175 for each user 105.

A request to setup a priority signaling flow may be received (block 1815). For example, as previously described, PCRF 155 may receive a request to setup a priority signaling flow via HSGW 145. PCRF 155 may consult HSS 165 to determine a state of PSSI 175. If the state of PSSI 175 matches PSSI 175 of user device 110, then PCRF 155 may authorize the setting up of the priority signaling flow. If the state of PSSI 175 does not match, then PCRF 155 may deny the establishment of the priority signaling flow. For purposes of discussion, it is assumed that PSSI 175 matches PSSI 175 of user device 110.

A signaling flow may be established (block 1820). For example, as previously described, PCRF 155 may establish a priority signaling flow with user device 1 10. PCRF 155 may select various parameters (e.g., QCI, ARP, and/or the like) with respect to the priority signaling flow.

A dialing string may be received (block 1825). For example, as previously described, IMS 160 may receive a dialing string from user device 110. The dialing string may correspond to a telephone number (e.g., a conventional 10-digit telephone number), a non-telephone number (e.g., a telephone number with added symbols (e.g., #, *), or another type of alphanumeric character string.

It may be determined whether to activate priority service based on the dialing string (block 1830). IMS 160 may determine whether to activate priority service based on the dialing string. For example, in one implementation, IMS 160 may consult or reference a database (not illustrated) that includes priority dialing strings. IMS 160 may compare the received dialing string from user device 110 with strings in the database to determine whether the received dialing string is a priority communication. In another implementation, IMS 160 may determine whether the received dialing string is a priority communication based on prefix codes, symbols, and/or other characteristics that distinguishes the string from a conventional or non-priority communication.

When it is determined that the dialing string corresponds to a priority communication (block 1830—YES), the priority service may be activated (block 1835). For example, IMS 160 may set PSAI 180 to an "on" state. In some instances, IMS 160 may perform a communication setup (e.g., a call setup) based on the received dialing string.

Referring to FIG. 18B, a request to setup a bearer flow may be received (block 1840). For example, as previously described, PCRF 155 may receive a request to setup a priority bearer flow via HSGW 145.

A bearer flow may be established (block 1845). For example, as previously described, PCRF 155 may establish a priority bearer flow. PCRF 155 may select various parameters (e.g., QCI, ARP, and/or the like) with respect to the priority bearer flow.

Priority packets may be received (block 1850). Network 115 may receive priority packets over the established priority bearer flow.

Referring back to block 1830 of FIG. 18A, when it is determined that the dialing string does not correspond to a priority communication (block 1830—NO), the priority service may be denied (block 1855). For example, as previously described, IMS 160 may set PSAI 160 to an "off" state. Network 115 may also tear down the established priority signaling flow.

Although FIG. 18 illustrates an exemplary process 1800, in other implementations, fewer, additional, and/or different operations may be performed. For example, in some instances, a non-subscriber requesting a priority communication (e.g., texting, web browsing, etc.), may not request a priority signaling flow. Additionally, as previously described, variations exist with respect to when the dialing string is received, authorization takes place, communication set-up takes place, etc. Additionally, or alternatively, depending on whether user 105 is a subscriber or non-subscriber and the type of priority communication, one or more operations of process 1800 may be omitted and/or executed in a different order, as previously described herein.

The foregoing description of implementations provides illustration, but is not intended to be exhaustive or to limit the implementations to the precise form disclosed. Accordingly, modifications to the embodiments, implementations, etc., described herein may be possible.

The term "may" is used throughout this application and is intended to be interpreted, for example, as "having the potential to," "configured to," or "being able to," and not in a mandatory sense (e.g., as "must"). The terms "a," "an," and "the" are intended to be interpreted to include one or more items. Where only one item is intended, the term "one" or similar language is used. Further, the phrase "based on" is intended to be interpreted as "based, at least in part, on," unless explicitly stated otherwise. The term "and/or" is intended to be interpreted to include any and all combinations of one or more of the associated list items.

In addition, while series of blocks have been described with regard to the processes illustrated in FIGS. 17, 18A and 18B, the order of the blocks may be modified in other implementations. Further, non-dependent blocks may be performed in parallel.

It will be apparent that the device(s) described herein may be implemented in many different forms of software or firmware in combination with hardware in the implementations illustrated in the figures. The actual software code (executable by hardware) or specialized control hardware used to implement these concepts does not limit the disclosure of the invention. Thus, the operation and behavior of a device(s) was described without reference to the specific software code—it being understood that software and control hardware can be designed to implement the concepts based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the implementations described herein unless explicitly described as such.

What is claimed is:

1. A method comprising:
    indicating, by a user device, a state associated with a priority service subscription indicator, wherein the state is one of a first state that indicates a user has a subscription for priority service or a second state that indicates the user does not have a subscription for priority service;
    indicating, by the user device, a state associated with a priority service activation indicator, wherein the state is one of a first state that indicates a network has authorized the user to use priority service or a second state that indicates the network has not authorized the user to use priority service;
    receiving, by the user device, an input request for invoking a priority service for a priority communication;
    determining, by the user device, in response to the receiving, whether the user of the user device is a subscriber of the priority service based on the state associated with the priority service subscription indicator;
    determining, by the user device, in response to the receiving, whether the user of the user device has been authorized by the network to use priority service based on the state associated with the priority service activation indicator; and
    establishing, by the user device, network resources on which the priority communication is to be transmitted, based on the state associated with the priority service subscription indicator and the state associated with the priority service activation indicator.

2. The method of claim 1, further comprising:
    identifying, by the user device, a type of priority communication based on the input request, and wherein the priority service subscription indicator and the priority service activation indicator correspond to a mode of operation of the user device.

3. The method of claim 2, further comprising:
    determining, by the user device, whether a priority signal flow is to be established based on the identified type of priority communication, and wherein the input request includes a priority string;
    transmitting, by the user device, the priority string;
    receiving, by the user device, a response to the transmitting; and
    changing, by the user device, the state associated with the priority service activation indicator from the second state to the first state based on the received response.

4. The method of claim 1, wherein the network resources includes a non-priority signaling flow or a priority signaling flow, and the method further comprising:
    establishing, by the user device, the non-priority signaling flow or the priority signaling flow based on the state of the priority service subscription indicator.

5. The method of claim 1, further comprising:
    transmitting, by the user device, the input request for invoking the priority service, wherein the input request includes the state of the priority service subscription indicator and the state of the priority service activation indicator.

6. The method of claim 1, wherein the network resources include a priority bearer flow, and the method comprising:
    establishing, by the user device, the priority bearer flow on which the priority communication is transmitted.

7. A method comprising:
    indicating, by one or more network devices, a state of a priority service subscription indicator, wherein the state is one of a first state that indicates a user has a subscription for priority service or a second state that indicates the user does not have a subscription for priority service;
    indicating, by the one or more network devices, a state of a priority service activation indicator, wherein the state is one of a first state that indicates the user is authorized to use priority service or a second state that indicates the user is not authorized to use priority service;
    receiving, by the one or more network devices, a user request for priority service, the user request including a state of the priority service subscription indicator;
    determining, by the one or more network devices, whether the state of the priority service subscription indicator included in the user request matches an indicated state of the priority service subscription indicator; and
    allocating, by the one or more network devices, network resources for a priority communication when it is determined that the state of the priority service subscription indicator included in the user request matches the indicated state of the priority service subscription indicator.

8. The method of claim 7, wherein the network resources include a priority signaling flow and the method further comprises:
- receiving, by the one or more network devices, a request to establish the priority signaling flow, and
- granting, by the one or more network devices, the request to establish the priority signaling flow when the indicated state of the priority service subscription indicator indicates that the user has the subscription for the priority service.

9. The method of claim 8, wherein the network resources include a priority bearer flow and the method further comprises:
- receiving, by the one or more network devices, a string;
- determining, by the one or more network devices, whether the string corresponds to a priority communication;
- indicating, by the one or more network devices, the state of the priority service activation indicator to be in the first state when it is determined that the string corresponds to a priority communication;
- receiving, by the one or more network devices, a request to establish a priority bearer flow, and
- granting, by the one or more network devices, the request to establish the priority bearer flow.

10. The method of claim 9, further comprising:
- releasing, by the one or more network devices, the priority bearer flow when it is determined that the priority communication is completed; and
- maintaining, by the one or more network devices, the priority signaling flow.

11. The method of claim 10, further comprising:
- omitting, by the one or more network devices, to change the state of the priority service activation indicator after the priority communication is completed.

12. The method of claim 7, wherein the network resources include a priority signaling flow and a priority bearer flow, the method further comprising:
- releasing, by the one or more network devices, the priority bearer flow when it is determined that the priority communication is completed;
- receiving, by the one or more network devices, another user request that includes a string that does not correspond to a type of priority communication;
- authorizing, by the one or more network devices, a non-priority communication based on the string that does not correspond to the type of priority communication; and
- releasing, by the one or more network device, the priority signaling flow when it is determined that the non-priority communication is completed.

13. The method of claim 7, wherein the indicated state of the priority service subscription indicator is of the second state and the network resources for the priority communication includes a signaling flow, and the method further comprising:
- establishing, by the one or more network devices, the signaling flow with a user device associated with the user;
- receiving, by the one or more network devices, a string pertaining to the priority communication;
- determining, by the one or more network devices, whether the string corresponds to a type of priority communication;
- establishing, by the one or more network devices, a priority signaling flow, when it is determined that the string corresponds to the type of priority communication; and
- tearing down, by the one or more network devices, the signaling flow.

14. A user device comprising:
- a memory to store instructions; and
- a processor to execute the instructions in the memory to:
  - indicate a state associated with a priority service subscription, wherein the state is one of a first state that indicates a user has a subscription for priority service or a second state that indicates the user does not have a subscription for priority service,
  - indicate a state associated with a priority service activation, wherein the state is one of a first state that indicates a network has authorized the user to use priority service or a second state that indicates the network has not authorized the user to use priority service,
  - receive a request, from a user, for invoking a priority service for a priority communication, and
  - establish the priority communication based on the state associated with the priority service subscription and the state associated with the priority service activation.

15. The user device of claim 14, wherein the user device is a mobile communication device.

16. The user device of claim 14, wherein, when establishing the priority communication, the processor executes instructions in the memory to:
- establish a non-priority signaling flow;
- transmit a dummy priority string via the non-priority signaling flow;
- receive a response to the transmitting;
- determine whether priority service is authorized based on the received response;
- establish a priority signaling flow when it is determined that the priority service is authorized;
- release the non-priority signaling flow;
- establish a priority bearer flow; and
- transmit the priority communication via the priority bearer flow.

17. The user device of claim 14, wherein, when establishing the priority communication, the processor executes instructions in the memory to:
- identify a type of priority communication based on the received request,
- establish a priority signaling flow when the state of the priority service subscription is of the first state and the type of priority communication requires the priority signaling flow, and
- establish a priority bearer flow.

18. The user device of claim 14, wherein, when establishing the priority communication, the processor executes instructions in the memory to:
- identify a type of priority communication based on the received request,
- determine whether a priority signaling flow is not required for the priority communication based on the identified type of priority communication, and
- transmit a priority bearer flow request that includes a priority string when it is determined that the priority signaling flow is not required, the state of the priority service subscription is of the first state, and the state of the priority service activation is of the second state.

19. The user device of claim 14, wherein, when establishing the priority communication, the processor executes instructions in the memory to:
- transmit a non-priority signaling flow request when the state of the priority service subscription is of the second state and the state of the priority service activation is of the second state, transmit a priority string over a non-priority signaling flow when the non-priority signaling flow is established, change the state of the priority service activation to the first state based on a received response to the transmitting the priority string, establish a priority bearer flow, and terminate the non-priority signaling flow.

20. The user device of claim 14, wherein, when establishing the priority communication, the processor executes instructions in the memory to:

identify a type of priority communication based on the received request, determine whether a priority signaling flow is not required for the priority communication based on the identified type of priority communication, establish a priority signaling flow when the state of the priority service subscription indicates is of the first state and the state of the priority service activation is of the second state, establish a priority bearer flow, and release the priority signaling flow when it is determined that the type of the priority communication does not require the priority signaling flow.

21. The user device of claim 14, wherein the priority communication includes one of a telephone call, a video call, an e-mail, a text message, a file transfer, or a Web access.

22. A network device comprising:

a memory to store instructions; and a processor to execute the instructions in the memory to:

receive a request for invoking a priority service for a priority communication from a user device, wherein the request includes a state of a priority service subscription indicator and a state of a priority service activation indicator;

determine whether a state associated with a priority service subscription, and stored by the network device, wherein the state is one of a first state that indicates a user has a subscription for priority service or a second state that indicates the user does not have a subscription for priority service, matches the state of the priority service subscription indicator included in the request;

determine whether a state associated with a priority service activation, and stored by the network device, wherein the state is one of a first state that indicates the user is authorized to use priority service or a second state that indicates the user is not authorized to use priority service, matches the state of the priority service activation indicator included in the request; and allocate network resources for the priority communication when it is determined that the priority service subscription indicator matches the stored state of the priority service subscription, and the priority service activation indicator matches the stored state of the priority service activation, wherein the network resources are allocated according to the state associated with the priority service subscription and the state associated with the priority service activation.

23. a tangible computer-readable medium containing instructions executable by at least one processor, the non-transitory computer-readable medium storing instructions for: recognizing a state of a priority service subscription indicator that indicates whether a user is a subscriber to priority service, wherein the state is one of a first state that indicates a user has a subscription for priority service or a second state that indicates the user does not have a subscription for priority service; recognizing a state of a priority service activation indicator that indicates whether priority service is activated, wherein the state is one of a first state that indicates a network has authorized the user to use priority service or a second state that indicates the network has not authorized the user to use priority service; identifying when a request for priority service is received; establishing a priority signaling flow when it is recognized that the state of the priority service activation indicator is of the second state and it is identified that a request for priority service is received; transmitting a priority string via the priority signaling flow; receiving a response to the transmitting; determining whether the state of the priority service activation indicator is to be changed to the first state based on the received response; establishing a priority bearer flow when it is determined that the state of the priority service activation indicator is to be changed to the first state; and transmitting a priority communication when the priority bearer flow is established.

24. the non-transitory computer-readable medium of claim 23, further storing one or more instructions for: identifying a type of the priority communication; and releasing the priority signaling flow based on the identifying.

25. the non-transitory computer-readable medium of claim 23, further storing one or more instructions for: establishing a non-priority signaling flow when it is recognized that the state of the priority service subscription indicator is of the second state and it is identified that a request for a priority service is received; transmitting a dummy priority string via the non-priority signaling flow; receiving a priority response to the transmitting; determining whether the state of the priority service activation indicator is to be changed to the first state based on the received priority response; establishing a priority signaling flow when it is determined that the state of the priority service activation indicator is to be changed to the first state; releasing the non-priority signaling flow; and establishing a priority bearer flow.

* * * * *